United States Patent
Mortel

(10) Patent No.: US 9,298,275 B2
(45) Date of Patent: Mar. 29, 2016

(54) HYBRID KEYBOARD FOR MOBILE DEVICE

(71) Applicant: BlackBerry Limited, Waterloo (CA)

(72) Inventor: Melecio Leano Mortel, Waterloo (CA)

(73) Assignee: BlackBerry Limited, Waterloo, CA (US)

( * ) Notice: Subject to any disclaimer, the term of this patent is extended or adjusted under 35 U.S.C. 154(b) by 164 days.

(21) Appl. No.: 13/758,510

(22) Filed: Feb. 4, 2013

(65) Prior Publication Data

US 2014/0218297 A1 Aug. 7, 2014

(51) Int. Cl.
  G06F 3/02 (2006.01)
  G06F 3/023 (2006.01)
  G06F 3/044 (2006.01)
  G06F 3/0488 (2013.01)

(52) U.S. Cl.
  CPC ............ G06F 3/0233 (2013.01); G06F 3/0236 (2013.01); G06F 3/044 (2013.01); G06F 3/04886 (2013.01)

(58) Field of Classification Search
  None
  See application file for complete search history.

(56) References Cited

U.S. PATENT DOCUMENTS

| | | | |
|---|---|---|---|
| 6,885,317 B1* | 4/2005 | Gutowitz | 341/22 |
| 2001/0048378 A1 | 12/2001 | Horie | |
| 2002/0097227 A1* | 7/2002 | Chu et al. | 345/168 |
| 2003/0193478 A1* | 10/2003 | Ng et al. | 345/168 |
| 2006/0082544 A1 | 4/2006 | Wieck et al. | |
| 2008/0174570 A1* | 7/2008 | Jobs et al. | 345/173 |
| 2011/0018812 A1* | 1/2011 | Baird | 345/173 |
| 2011/0061017 A1 | 3/2011 | Ullrich et al. | |
| 2011/0201387 A1* | 8/2011 | Paek et al. | 455/566 |
| 2011/0241909 A1 | 10/2011 | Griffin | |
| 2011/0242138 A1* | 10/2011 | Tribble | 345/663 |
| 2012/0062465 A1* | 3/2012 | Spetalnick | 345/168 |
| 2012/0075192 A1* | 3/2012 | Marsden et al. | 345/168 |
| 2012/0113008 A1* | 5/2012 | Makinen et al. | 345/168 |
| 2012/0117506 A1* | 5/2012 | Koch et al. | 715/773 |
| 2013/0120271 A1* | 5/2013 | Lee et al. | 345/168 |
| 2014/0092003 A1* | 4/2014 | Liu | 345/156 |

FOREIGN PATENT DOCUMENTS

| | | | |
|---|---|---|---|
| WO | 2007084078 A1 | | 7/2007 |
| WO | WO 2007084078 A1 | * | 7/2007 |
| WO | 2008029492 A1 | | 3/2008 |

OTHER PUBLICATIONS

Loli, Review: TenGO 2.0 and TenGO Thumb, Aug. 4, 2006, www.osnews.com/story/15389/Review-TenGO-2.0-and-TenGO-Thumb.
The 1Line Keyboard: A QWERTY Layout in a Single Line Frank Chun Yat Li, Richard T. Guy, Koji Yatani, and Khai N. Truong—Oct. 16-19, 2011.

* cited by examiner

*Primary Examiner* — Ilana Spar
*Assistant Examiner* — Kirk Hermann
(74) *Attorney, Agent, or Firm* — Moffat & Co.

(57) ABSTRACT

A mobile device has a user interface comprising a plurality of keys arranged in a plurality of groups. A processor is operatively coupled to the user input device to receive user input from the user input device and to identify which group of keys has received the user input. A display is operatively coupled to the processor for displaying characters corresponding to the keys of the group in response to the user input. The keys may have capacitive touch sensors with haptic feedback.

20 Claims, 21 Drawing Sheets

HYBRID KEYBOARD FOR MOBILE DEVICE

CROSS-REFERENCE TO RELATED APPLICATIONS

This is the first application filed for the present technology.

TECHNICAL FIELD

The present technology relates generally to mobile devices and, in particular, to user interfaces for mobile devices.

BACKGROUND

Mobile devices conventionally have either a physical keyboard/keypad or a virtual keyboard/keypad that is selectively displayable on a touch-sensitive screen. In the former case, the physical keyboard/keypad occupies a significant proportion of the available frontal space on the device. Virtual keyboards, when displayed, also tend to occupy a significant proportion of the screen. One solution has been to provide the device with a slide-out keyboard but this adds girth, weight and complexity to the device. Another solution has been to provide the device with either smaller keys or fewer keys. Devices with keys that are too small make typing challenging. Devices with fewer keys than a minimal QWERTY keyboard (i.e. having multiple characters selectable by the same key) are generally not ergonomic for typing. Thus, there remains a real need for a user interface technology for mobile devices that addresses this technical problem.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

The present technology provides a hybrid keyboard for a mobile device. The hybrid keyboard has a plurality of smaller, grouped physical keys that, in response to receiving user input on one of the physical keys, causes the mobile device to display onscreen the characters corresponding to the keys of the selected group. The keys may have capacitive touch sensors to detect contact or proximity of a finger or thumb for the purposes of identifying which group of characters to display onscreen. The physical keys are smaller and/or more compactly disposed on the mobile device so as to occupy a lesser proportion of the total frontal space on the mobile device. The onscreen display of characters corresponding to groups of keys provides visual feedback to the user to guide the user's selection of the smaller keys. Haptic force feedback may also be employed to provide tactile user feedback to thus improve typing ergonomics and the overall user experience.

Accordingly, one aspect of the present technology is a method performed by a mobile device of receiving user input via a user interface comprising keys arranged in a plurality of groups, identifying which group of keys has received the user input, and displaying on a display the group of keys that has received the user input.

Another aspect of the present technology is a computer-readable medium comprising instructions in code which when loaded into a memory and executed by a processor of a mobile device cause the mobile device to receive user input via a user interface comprising keys arranged in a plurality of groups, identify which group of keys has received the user input, and display on a display the group of keys that has received the user input.

Another aspect of the present technology is a mobile device having a user interface comprising a plurality of keys arranged in a plurality of groups, a processor operatively coupled to the user input device to receive user input from the user input device and to identify which group of keys has received the user input, and a display operatively coupled to the processor for displaying the keys of the group in response to the user input.

The details and particulars of these aspects of the technology will now be described below, by way of example, with reference to the drawings.

Figure 1:
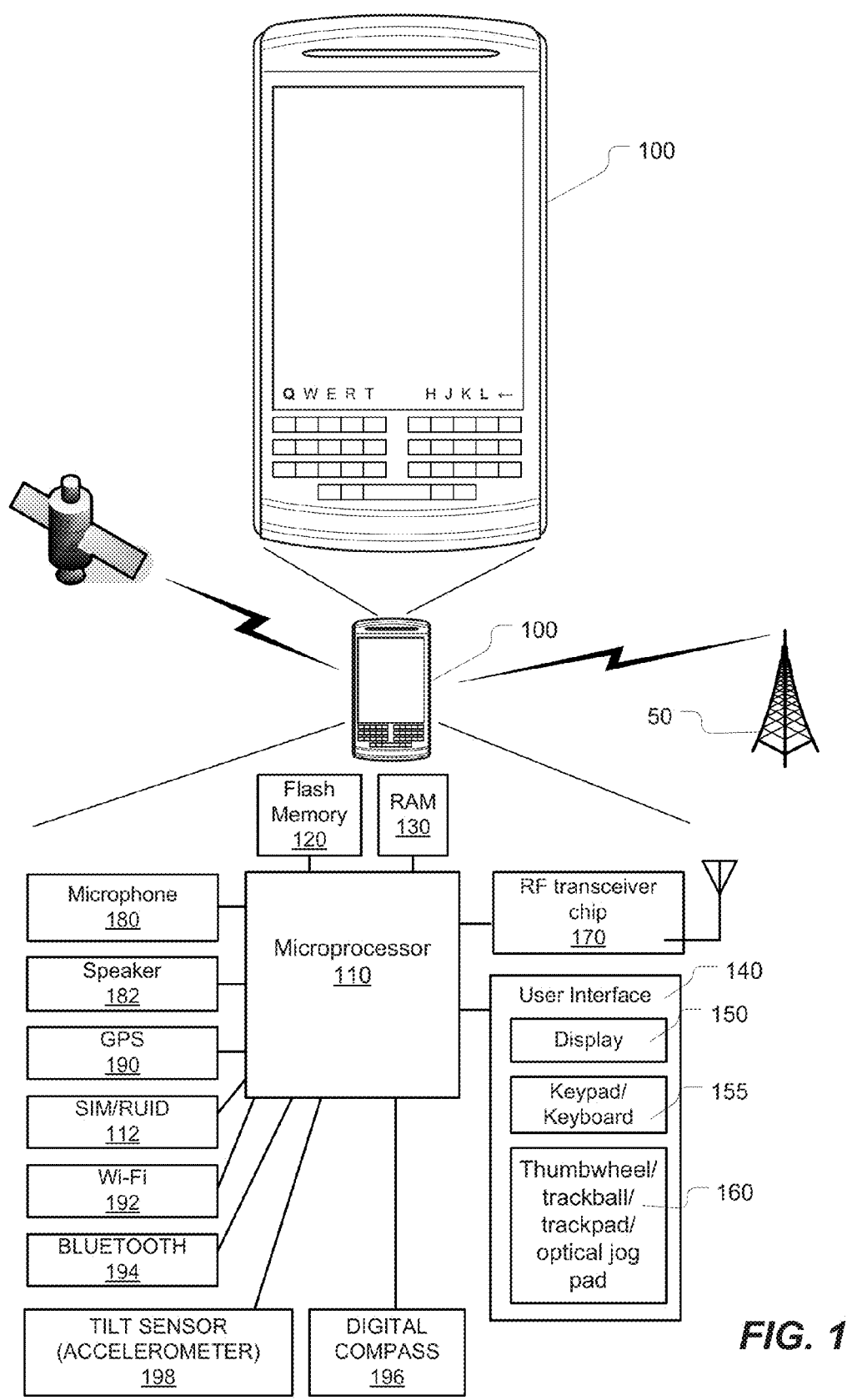
FIG. 1 is a depiction of a mobile device on which the present technology may be implemented, the depiction including a schematic depiction of some components of the mobile device.

FIG. 1 is a depiction of a mobile device as one example of a computing device on which the present technology may be implemented. This mobile device, which is generally designated by reference numeral 100, includes a processor 110 and memory 120, 130 for executing one or more applications. The memory may include flash memory 120 and/or random access memory (RAM) 130. Other types or forms of memory may be used.

As depicted by way of example in FIG. 1, the mobile device 100 includes a user interface 140 for interacting with the mobile device and its applications. The user interface 140 may include one or more user input devices and output devices, such as a display screen 150 (e.g. an LCD or LED screen or touch-sensitive display screen), and a keyboard or keypad 155. The physical keyboard/keypad 155 together with the onscreen display 150 of the corresponding characters forms what shall be referred to herein as a hybrid keyboard/keypad. The user interface may further include an optical jog pad 160 and/or a thumbwheel, trackball, track pad or equivalent.

As depicted by way of example in FIG. 1, the mobile device 100 includes a transceiver 170 for communicating with other devices. The transceiver 170 may be a radiofrequency (RF) transceiver for wirelessly communicating with one or more base stations over a cellular wireless network using cellular communication protocols and standards for both voice calls and packet data transfer such as GSM, CDMA, GPRS, EDGE, UMTS, LTE, etc.

Where the mobile device 100 is a wireless communications device, the device may include a Subscriber Identity Module (SIM) card 112 for GSM-type devices or a Re-Usable Identification Module (RUIM) card for CDMA-type devices. The RF transceiver 170 may include separate voice and data channels.

The mobile device 100 may also include one or more ports for wired connections, e.g. USB, HDMI, FireWire (IEEE 1394), etc.

The mobile device 100 may further include a microphone 180 for transforming voice input in the form of sound waves into an electrical signal, a speaker 182 and/or an earphone jack.

The mobile device 100 may also include a positioning subsystem such as a Global Positioning System (GPS) receiver 190 (e.g. in the form of a chip or chipset) for receiving GPS radio signals transmitted from one or more orbiting GPS satellites. Any other global navigation satellite system (GNSS) receiver may be used in lieu of GPS.

Optionally, the mobile device 100 may include a Wi-Fi™ transceiver 192, a Bluetooth® transceiver 194, and/or a near-field communications (NFC) chip. The computing device 100 may also optionally include a transceiver for WiMax™ (IEEE 802.16), a transceiver for ZigBee® (IEEE 802.15.4-2003 or other wireless personal area networks), an infrared transceiver or an ultra-wideband transceiver.

Optionally, the mobile device may include other sensors like a digital compass 196 and/or a tilt sensor or accelerometer 198. The mobile device may include other components not mentioned herein.

A mobile device is one example of a computing device 100 on which the present technology may be implemented. The technology is particularly useful for small devices that have small keyboards and limited space for display screens. Although this technology is primarily intended to be applied to mobile devices such as handheld electronic devices, personal communications devices, smart phones, cell phones, satellite phones, it may also be used on tablets, laptops, palmtops, notebooks, desktop personal computers, handheld game consoles, kiosks, or other such computing devices. The technologies disclosed herein may be employed on either wireless or wired devices or even on devices with no data communication capability. The technology may furthermore be applied to vehicle computer systems having a small keyboard and display or to any computer-controlled machinery, apparatus, or equipment that includes a physical keyboard and display.

To implement this novel technology, the user interface 140 of the mobile device 100 has a user input device that includes a plurality of physical keys. In most embodiments, the keys are entirely disposed on the front face of the mobile device below the display screen. The keys together constitute the keyboard 155.

Figure 2:
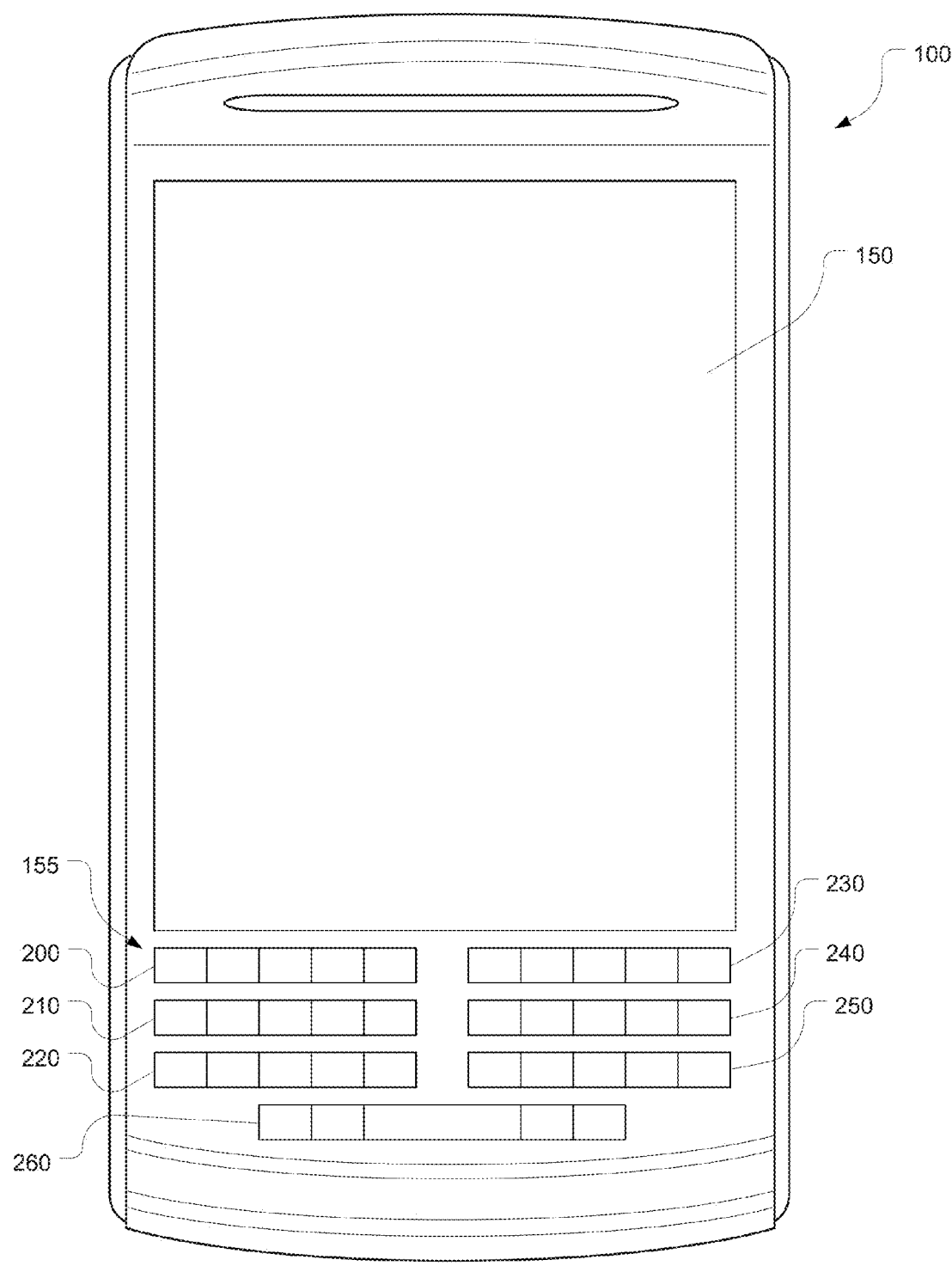
FIG. 2 is a depiction of a mobile device having a hybrid keyboard in accordance with one implementation of the technology.

These keys may be arranged in a plurality of groups as shown in FIGS. 1 and 2. In the keyboard 155 shown by way of example in FIGS. 1 and 2, there are seven groups of keys, namely a top left-side group of keys 200, a middle left-side group of keys 210, a lower left-side group of keys 220, a top right-side group of keys 230, a middle right-side group of keys 240, a lower right-side group of keys 250 and a bottom group of keys 260. The groups of keys in this example keyboard 155 are all arranged in rows of adjacent keys.

In the embodiments depicted by way of example in FIGS. 1 and 2, the height of each of the keys is the same although the height of the keys may vary in other embodiments. As shown in this embodiment, the width of all but one key (e.g. the space bar key) is the same for all other keys, but again this may vary in other embodiments. There is a small space shown in FIG. 1 and FIG. 2 between the top row (key groups 200, 230) and the middle row (key groups 210, 240) and a small space between the middle row (key groups 210, 240) and the lower row (key groups 220, 250). There is also a small space between the lower row (key groups 220, 250) and the bottom row (key group 260). This space may be varied or even eliminated. In this illustrated embodiment, the space between rows is less than the height of the keys although this is not necessarily the case. The left-side groups of keys are separated or divided from the right-side groups of keys by a space although this space may be varied or eliminated in other embodiments.

In the illustrated embodiment, the first six groups of keys form three aligned rows and two columns with the seventh group extending parallel to the lower row. In other words, the top row of left-side keys is substantially aligned with the top row of right-side keys, the middle row of left-side keys is substantially aligned with the middle row of right-side keys, and the lower row of left-side keys is substantially aligned with the lower row of right-side keys. To recap, in this embodiment, the top left-side row thus defines the first group of keys 200, the middle left-side row the second group of keys 210, and the lower left-side row the third group of keys 220. Likewise, the top right-side row defines the fourth group of keys 230, the middle right-side row the fifth group of keys 240, and the lower right-side row the sixth group of keys 250.

The bottom row (which contains the space bar in this example) defines the seventh group of keys 260.

The number of rows of keys and the groupings of keys may be varied as will be described and illustrated in greater detail below.

The processor 110 of the mobile device 100 is operatively coupled to the user input device to receive user input from the user input device. The processor is configured to identify which group of keys has received the user input (i.e. based on the signals received from by the processor from the keyboard). The display is operatively coupled to the processor for displaying the keys of the group in response to the user input. In other words, when contact or proximity of a finger or thumb to a key is detected, the entire group of keys is instantiated onscreen to enable the user to see which group of keys he or she is touching or proximate to.

In one embodiment, the user input device is a keyboard 155 comprising a plurality of capacitive touch keys. The capacitive touch keys enable the device to detect contact, touch or proximity of a finger or thumb to enable the device to identify or recognize the group of keys that the user is selecting. The user input device may, in one specific embodiment, be a keyboard comprising a plurality of capacitive touch keys having haptic feedback. Haptics provide mechanical feedback to the user to confirm, in a tactile manner, that one particular key has been pressed. To summarize, the capacitive touch keys with haptics provides a multi-step input to the processor: first, the processor receives a signal indicating that a finger or thumb is lightly touching or proximate to a given key. The group of keys to which the touched or proximal key belongs then determines which group of keys is to be instantiated onscreen. Optionally the key being touched or to which the finger or thumb is most proximate will be highlighted. Subsequently, or in some instances almost immediately thereafter, the processor receives a signal from the keyboard that a given key instantiated onscreen has been pressed. This optionally causes a haptics controller to generate a force feedback signal to exert an upward force on the key against the finger or thumb of the user. When the key is pressed, the highlighting of the selected character may also change (e.g. the selected character onscreen may blink or change its font, size, color, shading, bolding, italics, etc.). This visual change may be used to indicate entry or input of the character corresponding to the key that has been pressed.

Although the keys of the keyboard 155 are depicted as being configured in a QWERTY keyboard layout, other keyboard or keypad arrangements or layouts may be used, e.g. DVORAK (Dvorak Simplified Keyboard), AZERTY, Colemak, etc.

FIGS. 3-6 illustrate the operation of the hybrid keyboard of FIGS. 1 and 2. As shown in these four examples, any combination of rows of characters may be instantiated (displayed on the display screen) in response to user input (or in response to first and second user input). First and second user input may be synchronous (concurrent) or sequential. The group of characters may be displayed for a predetermined period of time before the group disappears, for example, between 1 and 5 seconds or for any user-configurable amount of time. Alternatively, the characters may persist on the display until further user input is received to supplant the group of characters.

Figure 3:
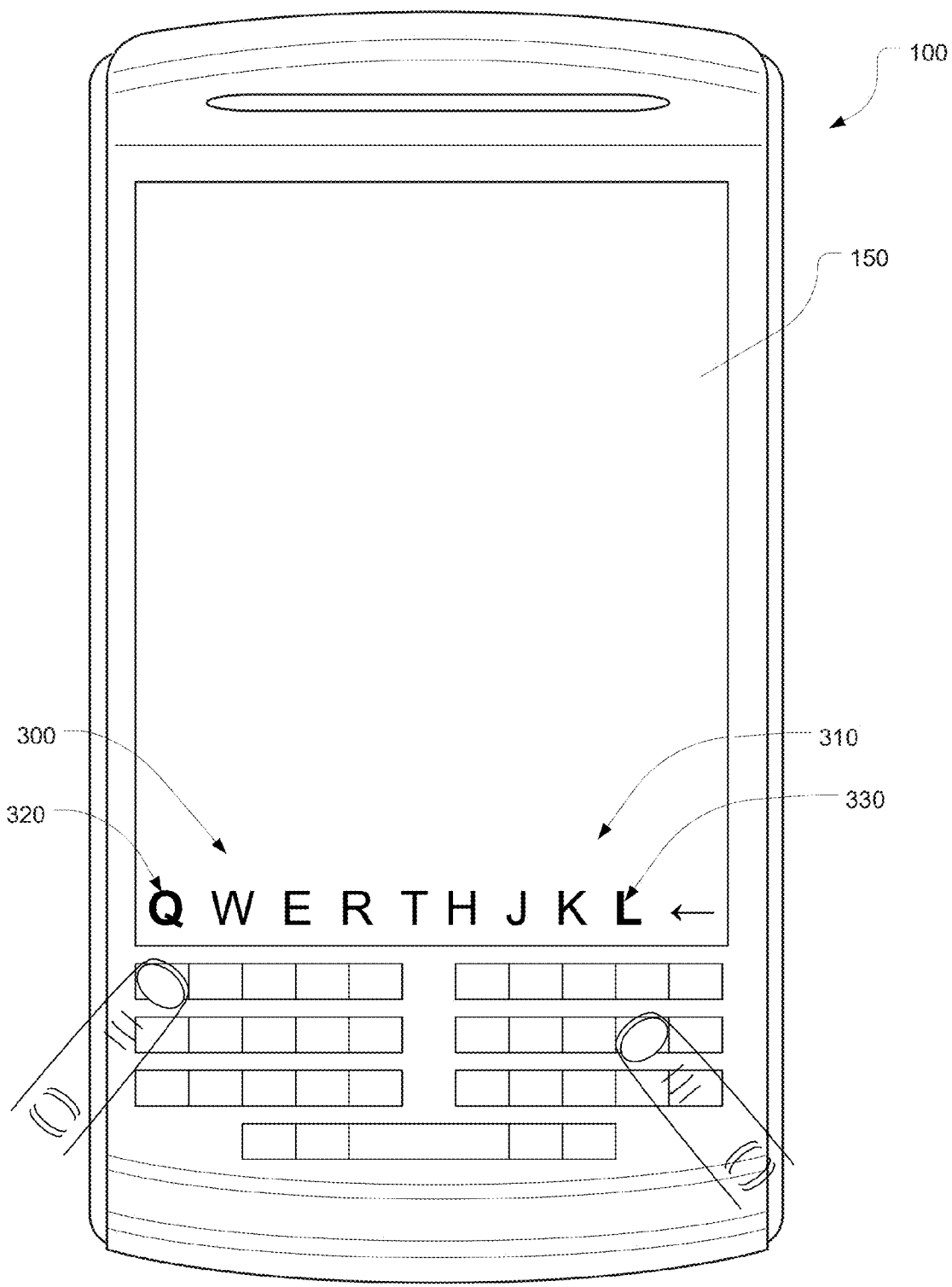
FIG. 3 depicts the mobile device displaying characters of the top left row of keys and characters of the middle right row of keys.

FIG. 3 depicts the mobile device displaying characters of the top left row of keys and characters of the middle right row of keys. In the example of FIG. 3, the five characters Q, W, E, R and T (designated collectively by reference numeral 300) corresponding to the five keys of the first group (top left-side row) are instantiated (i.e. displayed) in response to the first user input (of the left hand). The character Q (designated by reference numeral 320) is highlighted (e.g. bolded) to indicate that the Q key has been touched or that the left thumb or finger of the user is proximate to the Q key. Likewise, the characters H, J, K, L and ← (delete) corresponding to the right-side middle row (fifth group) are instantiated in response to the second user input (of the right hand). The second set of instantiated characters, collectively denoted by reference numeral 310, may be displayed along the bottom portion of the screen in alignment with the first set of characters 300. Spacing may be provided between the two sets of characters to clearly delineate the two sets. The characters may optionally be aligned with their respective keys. In this example, the letter L (denoted by reference numeral 330) is highlighted to indicate that the user's thumb or finger is contacting, or is proximate to, the L key.

Figure 4:
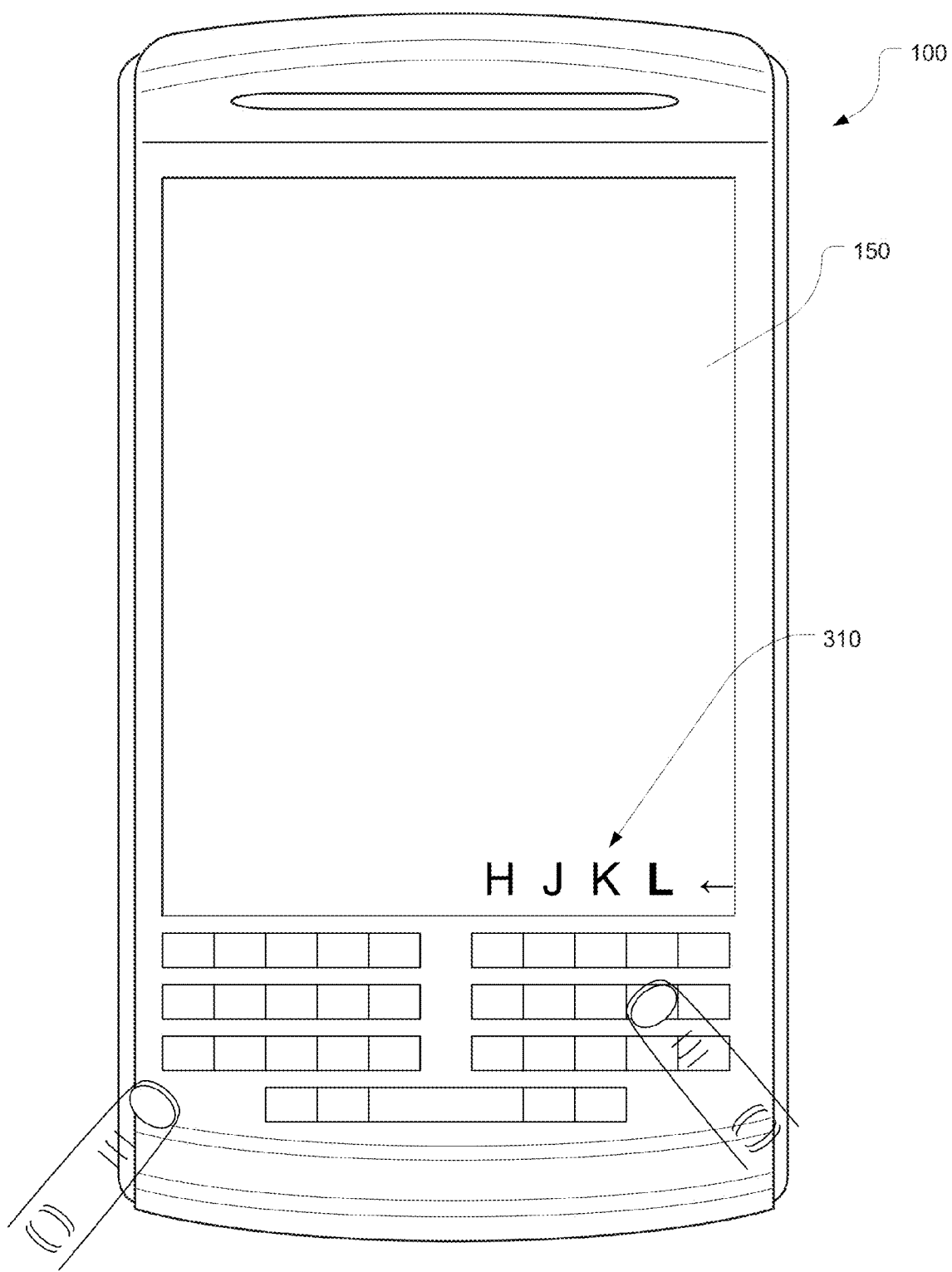
FIG. 4 depicts the mobile device displaying only the middle right row of keys.

FIG. 4 depicts the mobile device displaying only the middle right row of keys. In this case, only the characters H, J, K, L and ← (delete) corresponding to the right-side middle row (fifth group) are displayed. Thus, the left-side and right-side groups of keys may be instantiated independently of each other.

Figure 5:
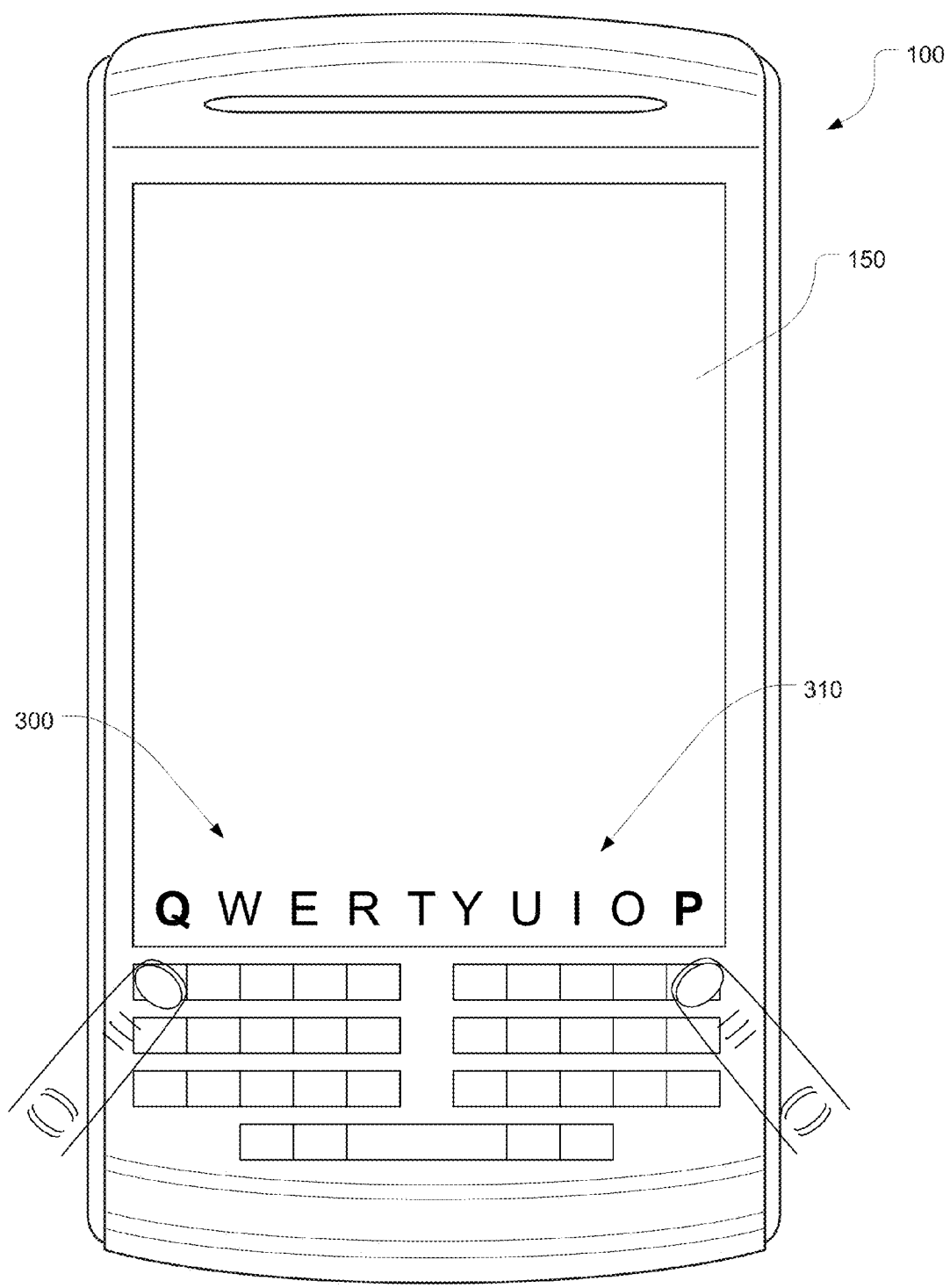
FIG. 5 depicts the mobile device displaying characters of the top left row of keys and characters of the top right row of keys.

As another example, FIG. 5 depicts the mobile device displaying a first set of characters 300 corresponding to the top left-side group of keys and a second set of characters 310 corresponding to the top right-side group of keys.

Figure 6:
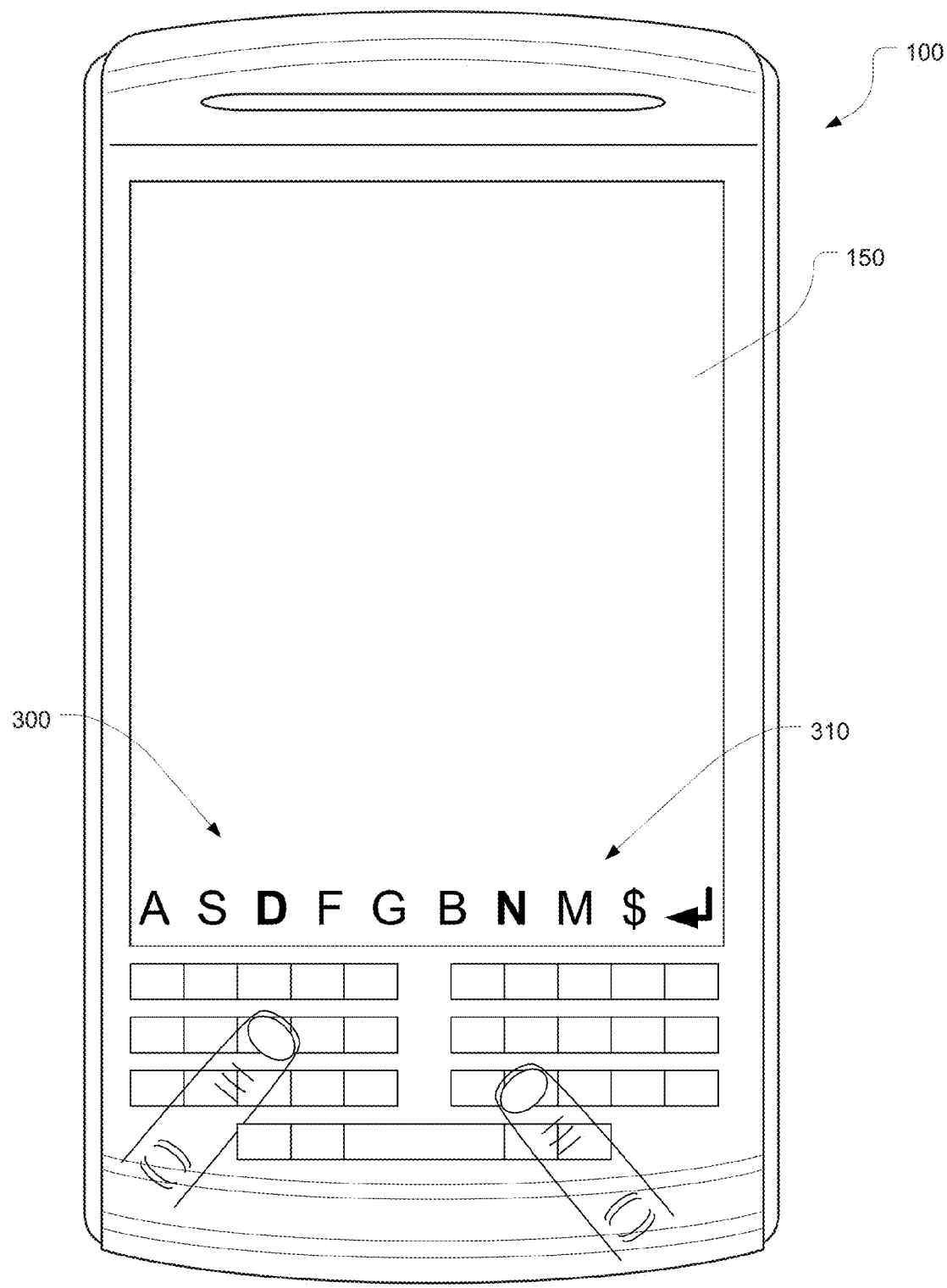
FIG. 6 depicts the mobile device displaying characters of the middle left row of keys and characters of the bottom right row of keys.

As a further example, FIG. 6 depicts the mobile device displaying a first set of characters 300 drawn from the middle left-side row of keys and a second set of characters 310 drawn from the bottom right-side row of keys.

Figure 7:
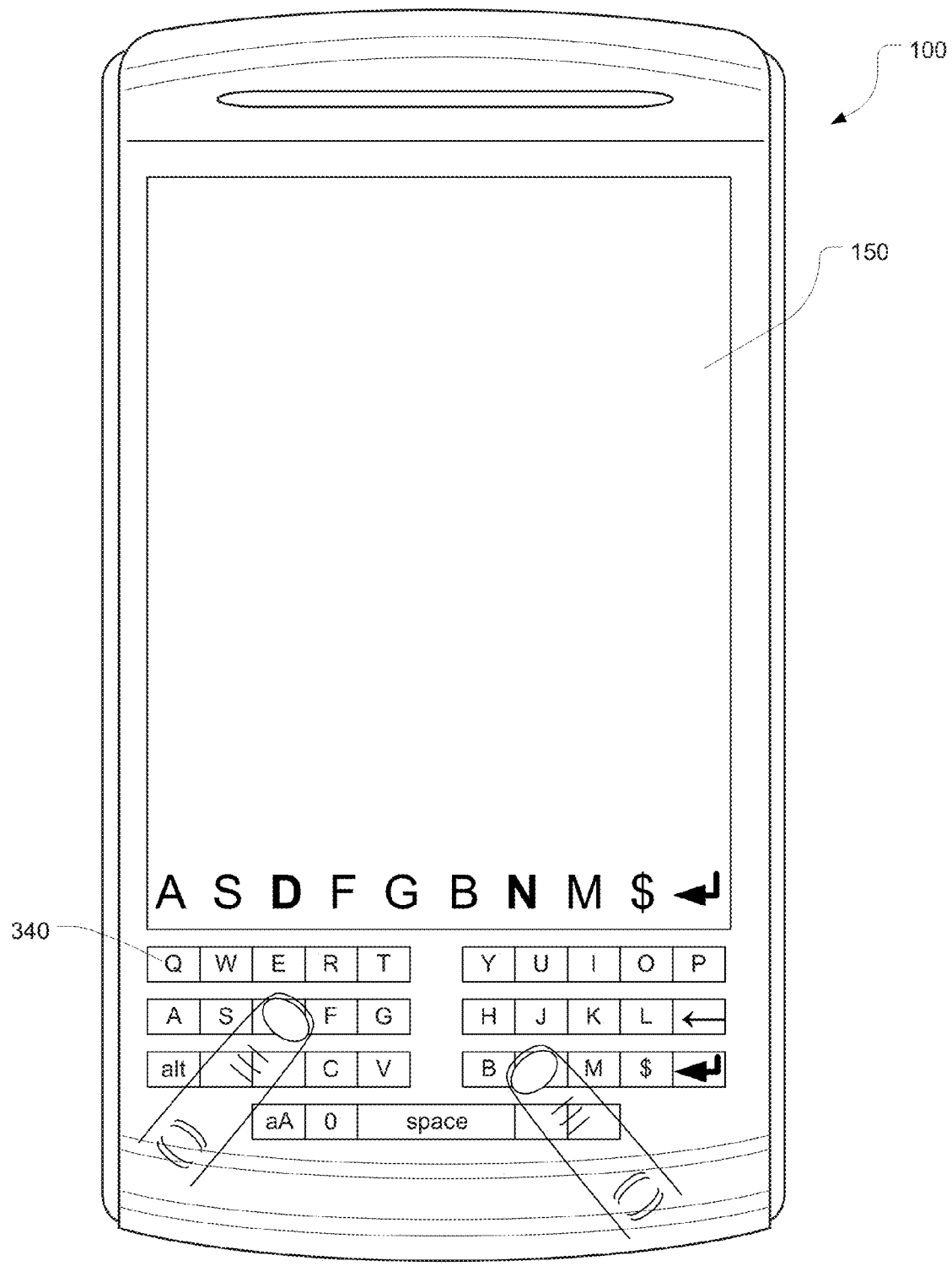
FIG. 7 depicts the mobile device displaying characters of the top left row of keys and characters of the top right row of keys, wherein the keys comprise key labels.

In another embodiment, as illustrated by way of example in FIG. 7, the keys 340 of the keyboard may have key labels. The key labels may be alphanumeric (e.g. A-Z, 0-9) and may optionally include mathematical operators (+, −, =, etc.) and symbols (e.g. exclamation mark, question mark, quotation mark, apostrophe, asterisk, parentheses, brackets, forward slash, back slash and other common keyboard symbols such as @, #, $, %, &, etc.) plus optionally various other functional keys such as, for example, enter, shift, tab, control, alt, delete, space, escape, caps lock, number lock, F1-F12, arrow keys, a separate number pad, etc. For a mobile device, however, the keyboard may have a limited number of keys due to space constraints. For example, the keyboard may include letters A-Z, numbers 0-9 superimposed on ten keys that also have letters, and a few main symbols and functional keys. FIG. 7 depicts one example of such a mobile device displaying characters of the top left row of keys and characters of the top right row of keys, wherein the keys comprise key labels. In this simplified example, only the letters and a few illustrative symbols and functional keys are depicted. The keys 340 may be backlit in one particular embodiment.

Figure 8:
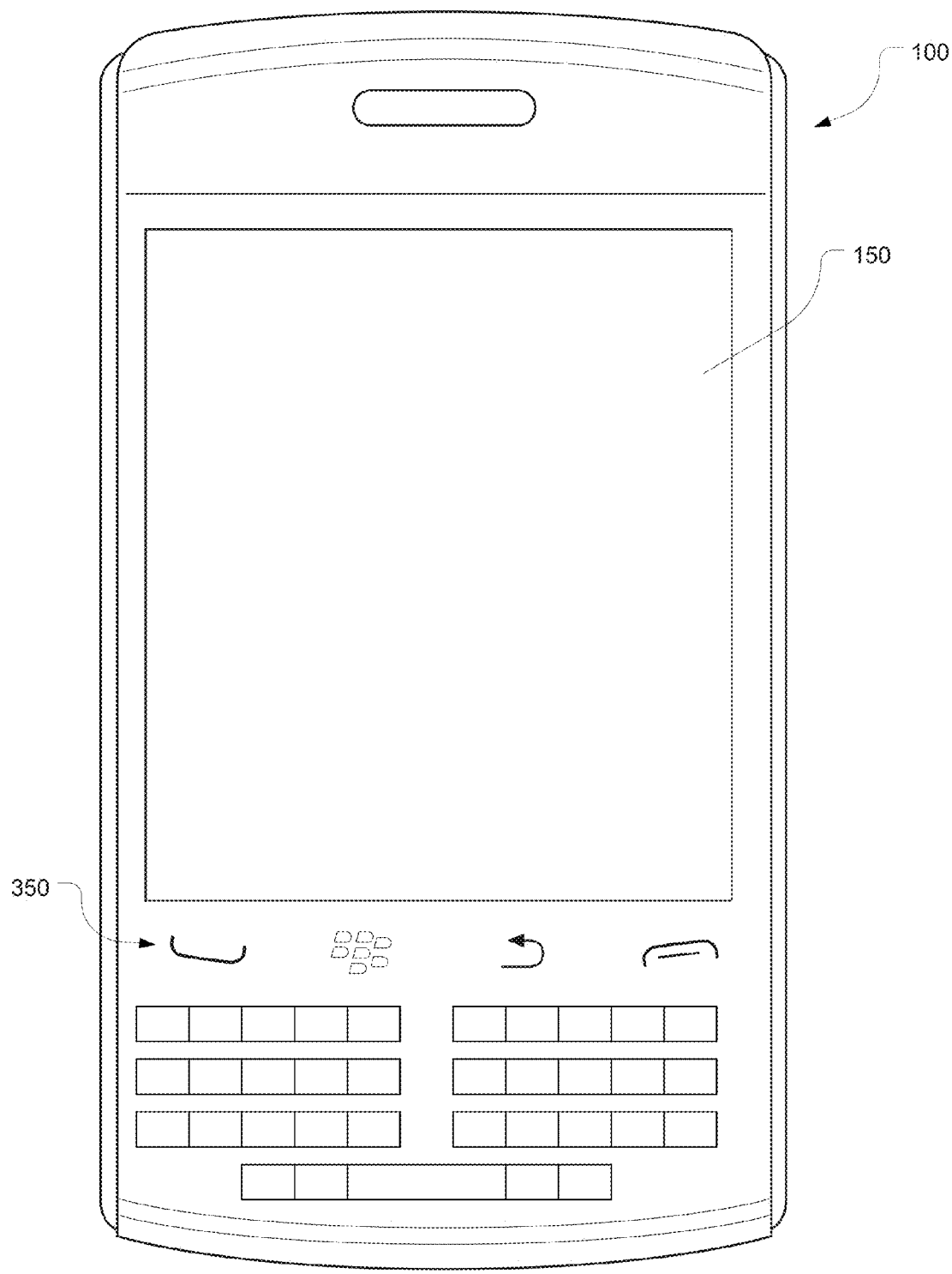
FIG. 8 depicts a mobile device with another form of hybrid keyboard.

FIG. 8 depicts a mobile device with another form of hybrid keyboard in which basic control buttons 350 are added to the user interface. From left to right, the control buttons 350 depicted are a call/talk button, a menu button, an escape/back button, an end call/power on/off button. Other buttons, keys, hotkeys, wheels, pads, or other input devices may be disposed on the front, back, top, bottom or sides of the device. In one embodiment, these control buttons are not displayed onscreen in response to user input, only the key groups of the keyboard. In another embodiment, these basic control buttons may also be displayed onscreen, e.g. as icons, in response to user input.

In the embodiment depicted by way of example in FIG. 8, the user input device comprises a plurality of left-side rows of keys and a plurality of right-side rows of keys as was the case in the embodiment of FIGS. 1 and 2. More specifically, the user input device shown by way of example in FIG. 8 has three left-side rows of keys, three right-side rows of keys aligned with but spaced apart from the left-side rows of keys, and a bottom row of keys including a space bar key. These rows form the keyboard 155. The four device keys are part of the input device but are not part of the keyboard in this case. As was the case with the first embodiment, the keys in FIG. 8 comprise capacitive touch sensors with haptic feedback and are arranged in a QWERTY keyboard configuration as seven groups of keys consisting of an upper row split into left and right groups, a middle row split into left and right groups, a lower row split into left and right groups, and a bottom row disposed beneath the lower row.

Figure 9:
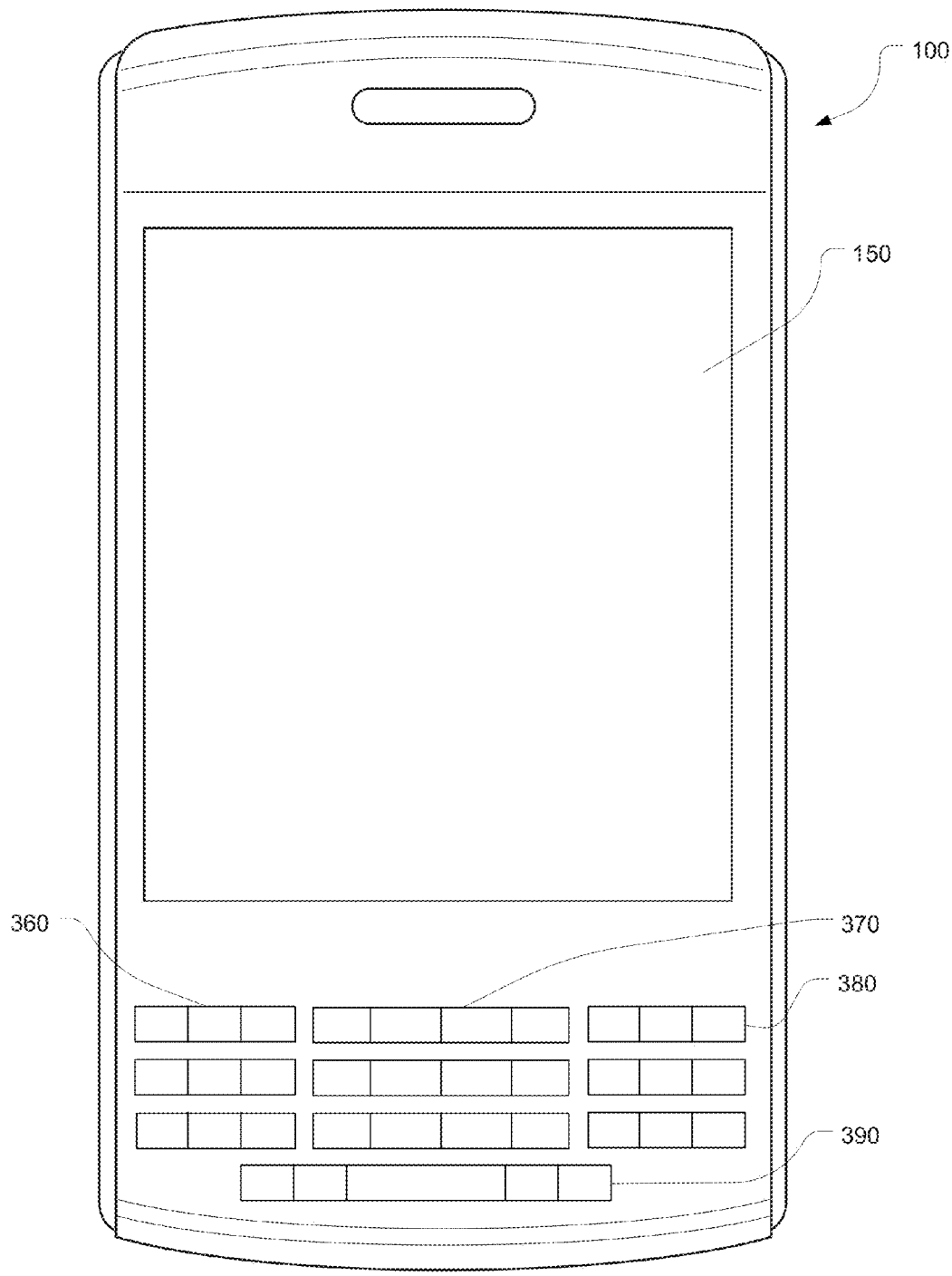
FIG. 9 depicts a mobile device in which the hybrid keyboard is grouped into ten groups of keys.

As mentioned above, the groupings of the keys may be varied. For example, FIG. 9 depicts a mobile device in which the hybrid keyboard is grouped into ten groups of keys. In this example, there are three left-side rows of keys 360 (each row consisting of 3 keys), three middle rows of keys 370 (each row consisting of 5 keys) and three right-side rows of keys 380 (each row consisting of 3 keys). There is also a bottom row of keys 390. The total number of keys and their configuration may thus be varied for different types of devices.

Figure 10:
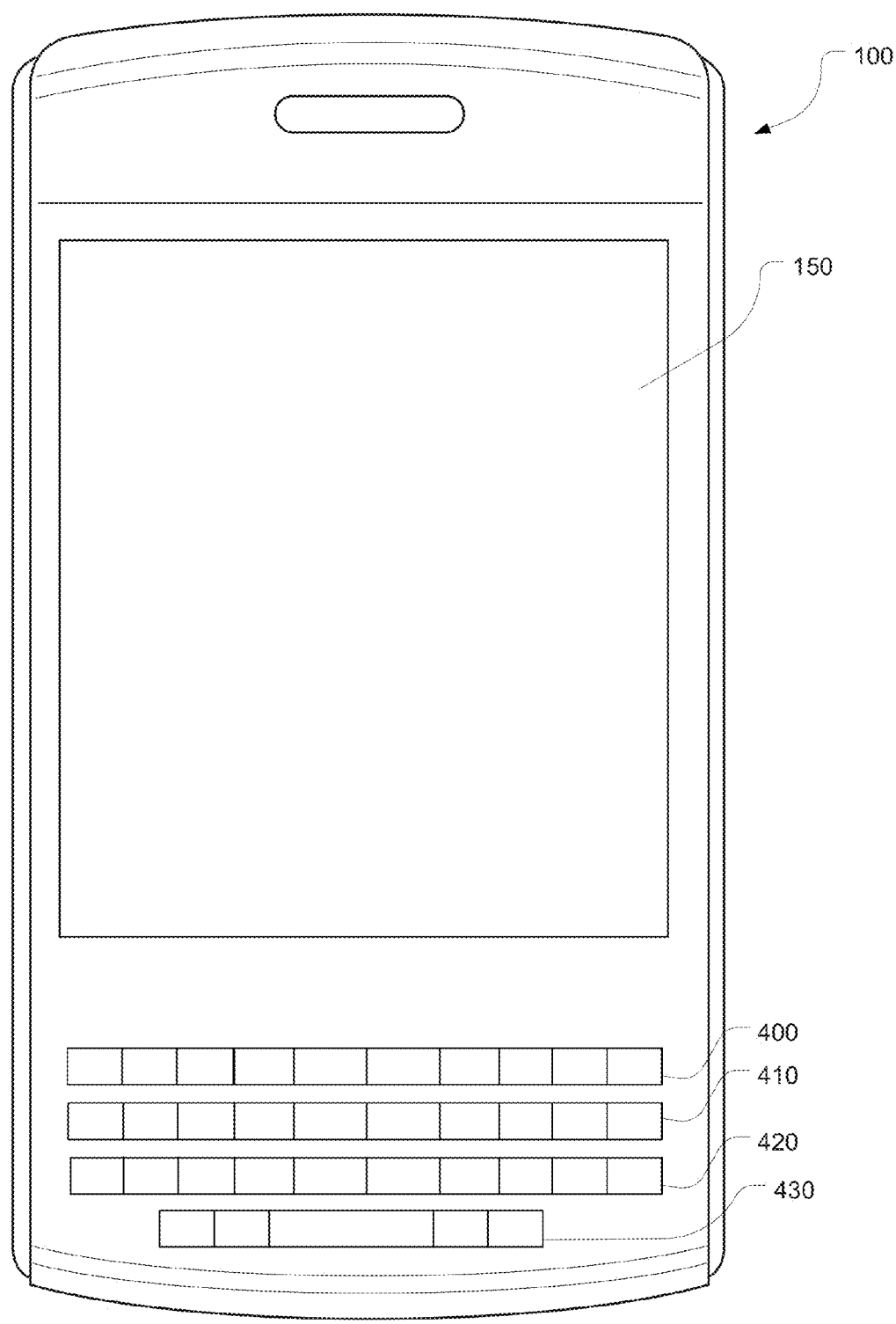
FIG. 10 depicts a mobile device in which the hybrid keyboard is grouped into four groups of keys.

The split rows may also be replaced with integral rows of keys as shown by way of example in FIG. 10. FIG. 10 depicts a mobile device in which the hybrid keyboard is grouped into four groups of keys, i.e. four rows of keys, namely a first row 400 of 10 keys, a second row 410 of 10 keys, a third row 420 of 10 keys and a fourth row 430 of 5 keys. Again, the number of keys may vary in other cases.

Figure 11:
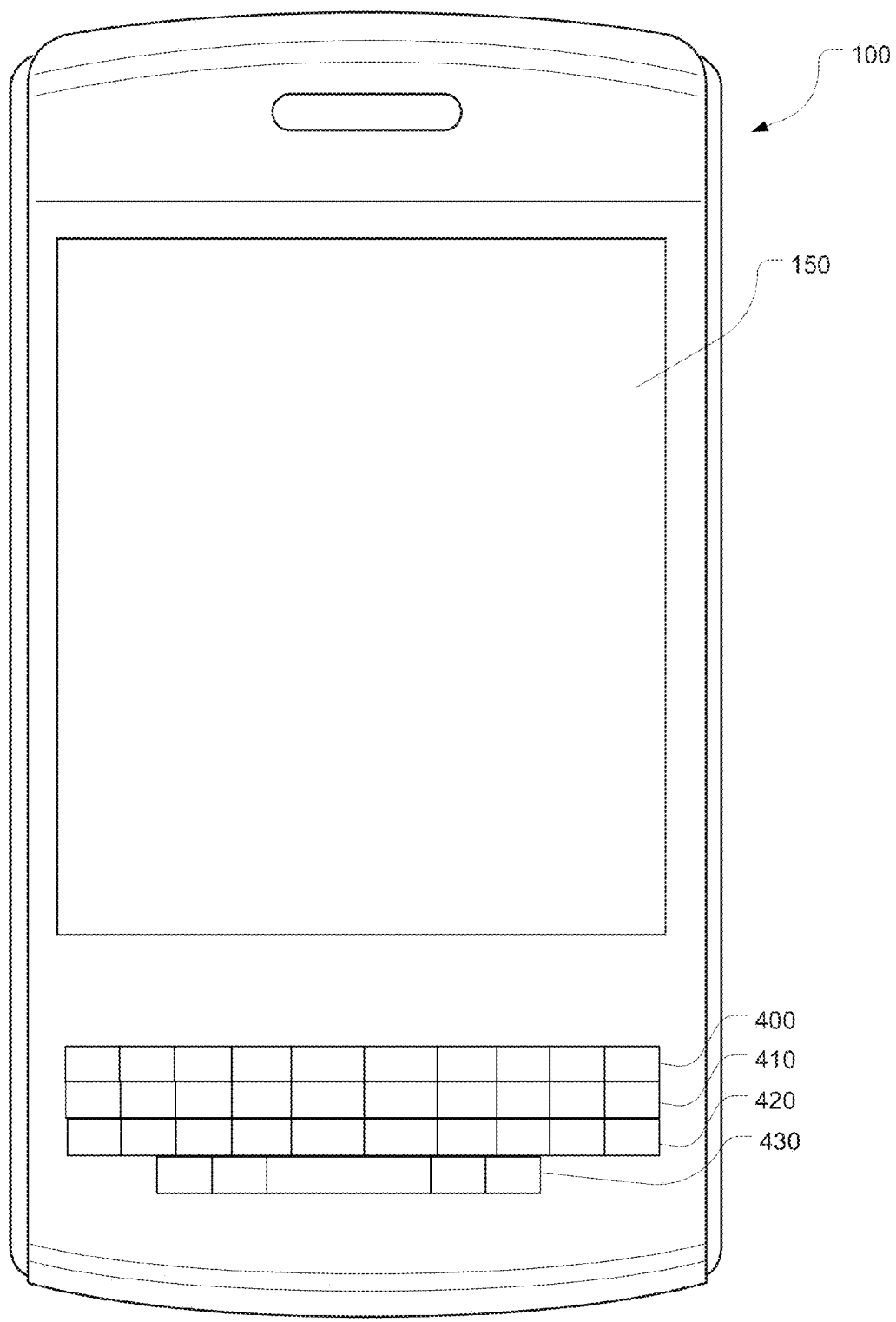
FIG. 11 depicts a mobile device in which the hybrid keyboard has four rows of keys with no spacing between each of the rows.

FIG. 11 depicts a mobile device in which the hybrid keyboard has four rows of keys (400, 410, 420, 430) with no spacing between each of the rows. Each of these rows is considered a separate group of keys.

Figure 12:
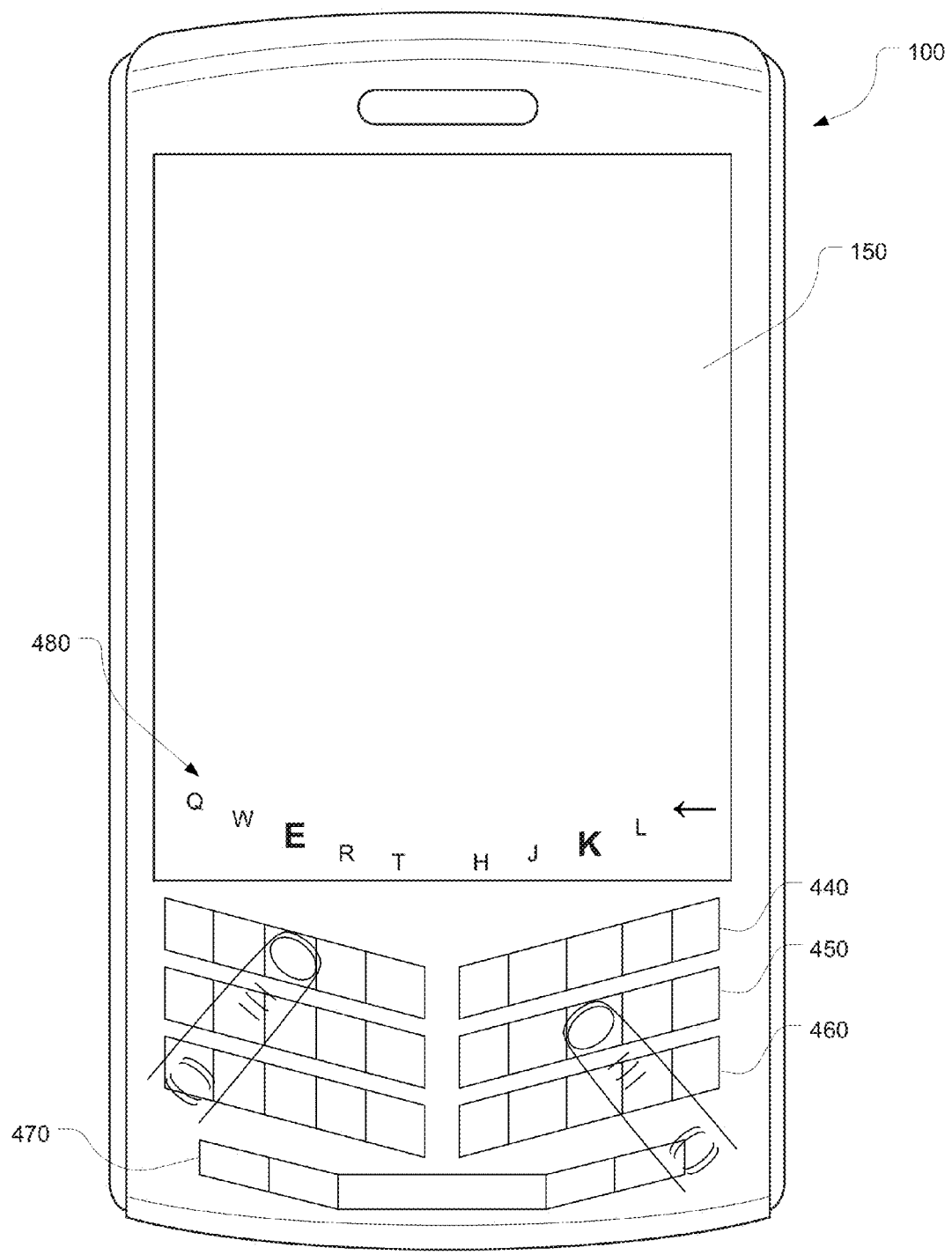
FIG. 12 depicts a mobile device in which the keys are arranged in angled groups of keys.

In the previously illustrated embodiments, the keys are arranged in straight lines. In other embodiments, the keys may be curved, angled or disposed in some other fashion. For example, FIG. 12 depicts a mobile device in which the keys are arranged in angled groups of keys. Thus, the hybrid keyboard of FIG. 12 contains a first pair of angled rows 440, a second pair of angled rows 450, a third pair of angled rows 460, and a bottom row 470 having two angled keys on the left, a straight space bar (parallel to the display screen), and two other angled keys on the right of the space bar. In the embodiment depicted in FIG. 12, the selected characters E and K are highlighted not only by bolding but also by increasing their font size although the manner of graphically indicating the selected characters may be varied. In fact, it should be noted that it not necessary to highlight the selected characters at all but this is simply done to enhance the user experience.

Figure 13:
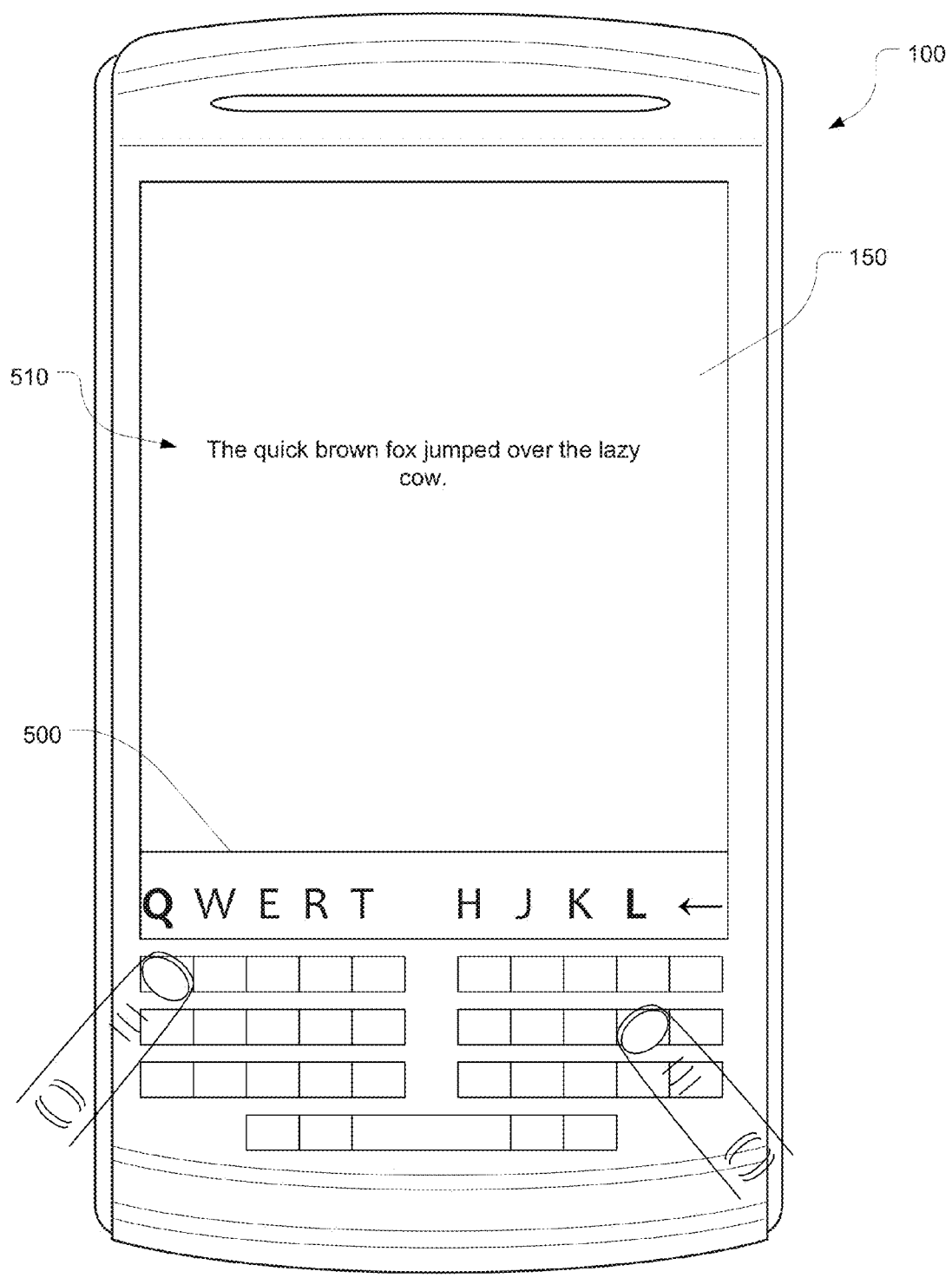
FIG. 13 depicts a mobile device in which bottom portion of the display comprises a character window or panel for displaying the characters corresponding to the keys of the selected groups.

In the previously illustrated embodiments, the characters are displayed along a bottom portion of the display screen. In other embodiments, the characters may be displayed elsewhere on the display. In yet other embodiments, the characters may be displayed in a dedicated panel, window, dialog, area, zone or the like which is distinct, divided or separated from the remainder of the display screen. For example, FIG. 13 depicts a mobile device in which the bottom portion of the display comprises a character window 500 or panel for displaying the characters corresponding to the keys of the selected groups. This character window or panel is separated from the remainder of the content on the display screen by a border or divider to make it clear to the user that the characters are not part of any textual content 510 being displayed onscreen. Textual content may be any e-mail, word processor document, etc. Furthermore, the size, color and font of the characters displayed in the character window may be varied, user-configurable or automatically adjusted to differentiate from any other text onscreen. In the illustrated example of FIG. 13, the font of the textual content 510 being typed onscreen is, for example, Arial 12-point. The device may automatically change the font of the characters in the character window 500 to, for example, Candara 24-point to visually distinguish the characters instantiated by the hybrid keyboard and the text being typed in the main portion of the display.

Figure 14:
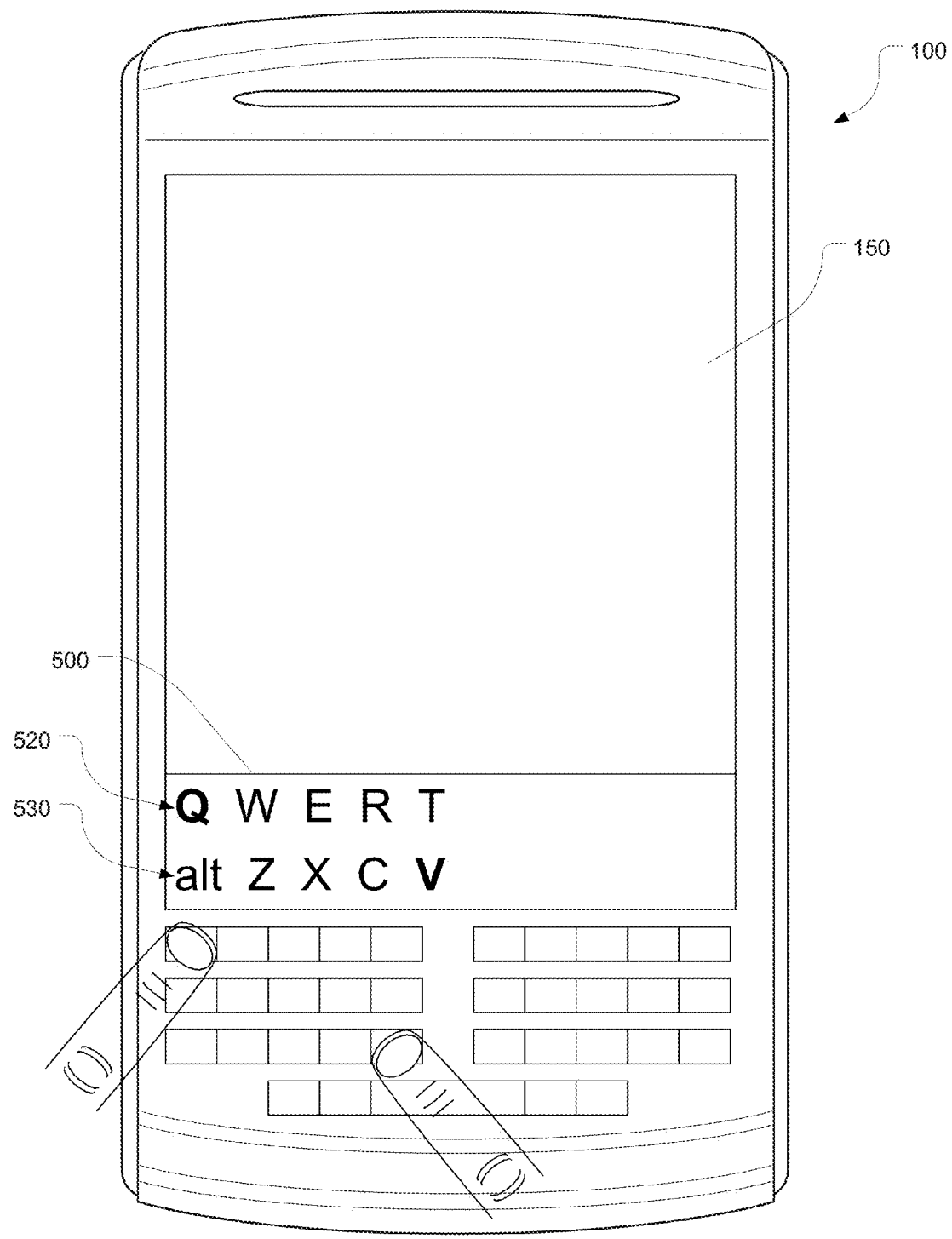
FIG. 14 depicts a mobile device in which the character window displays two rows of characters corresponding to two left-side rows of keys.

In the implementations illustrated thus far, there has been but a single row of characters displayed onscreen. However, in other implementations, there may be more than one row of characters. FIG. 14 depicts a mobile device in which the character window displays two vertically arranged rows of characters corresponding to two left-side rows of keys. These two left-side rows of characters may be invoked onscreen by receiving simultaneous, overlapping or sequential input on the corresponding left-side rows of keys. In one embodiment, a first type of highlighting may be used to indicate the letter corresponding to the key sensed by the capacitive touch sensor in the key whereas a second type of highlighting may be used to indicate the selected letter when the user actually depresses the key to select that letter. For example, a shadow may be shown when the user's finger or thumb contacts or hovers over the key (i.e. with sufficient proximity to be detected by the capacitive touch sensor). The character may blink or change color, size, font, etc. when the user actually presses on the key to input the letter. Alternatively, the graphical highlighting may be a larger font and/or a bolded and/or italicized and/or underlined font. A different color, arrow, pointer, etc. may also be used to identify a particular character.

Figure 15:
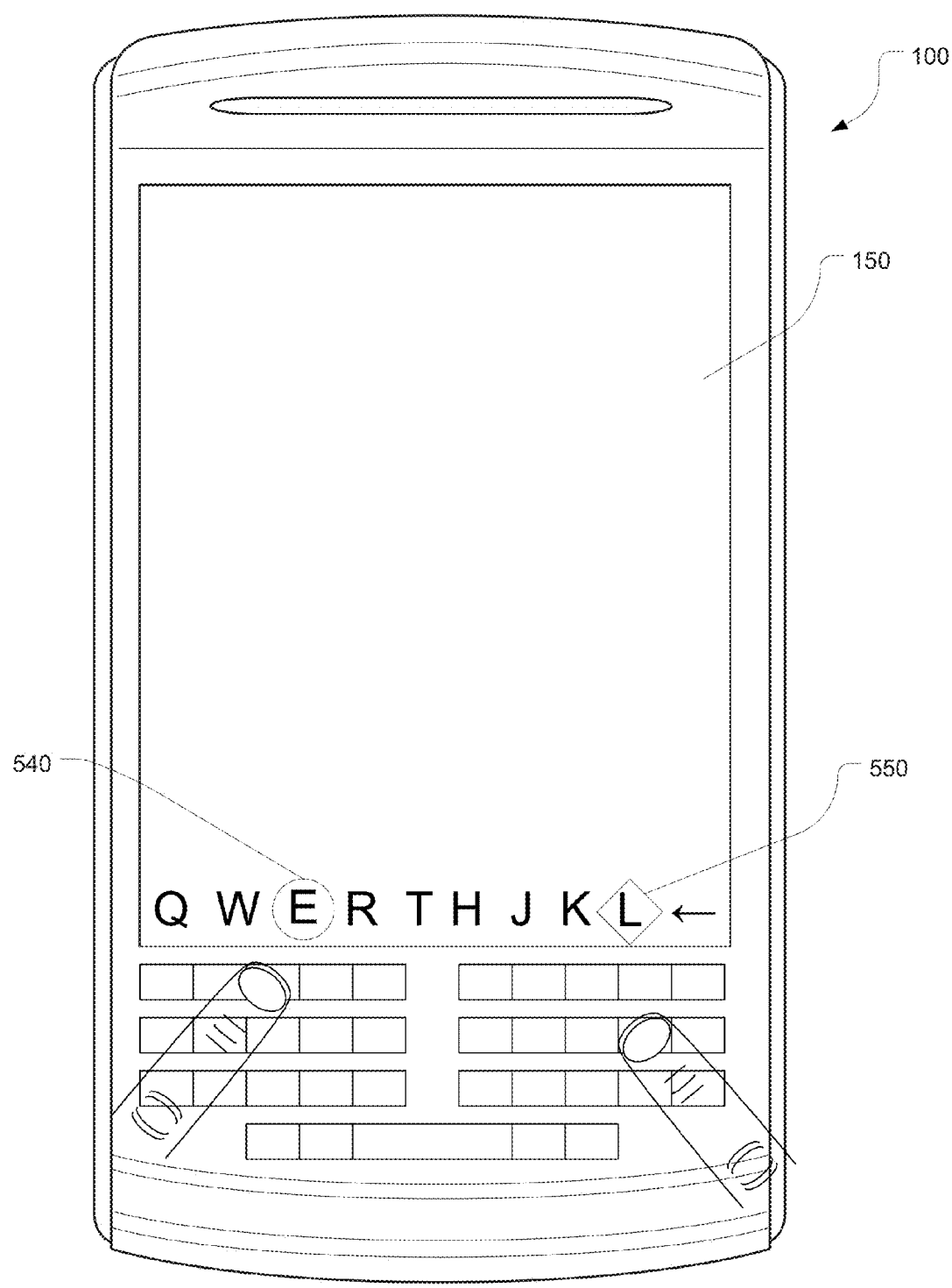
FIG. 15 depicts a mobile device in which the selected keys are graphically identified using a surrounding circle and a surrounding diamond instead of a bolded font.

FIG. 15 depicts a mobile device in which the selected keys are graphically identified using a circular or polygonal border surrounding the character corresponding to the selected key (instead of a bolded or different character font). For example, the circular or polygonal border may simply be a surrounding circle or a surrounding diamond (or any other desired shape).

In one implementation, the mobile device may implement a predictive word algorithm that dynamically predicts and suggests a completed word to the user based on the partial spelling of the word as it is being progressively typed. The next likely letter required to complete the predicted word may thus be indicated or highlighted in the character window to guide the user to the next letter required.

Figure 16:
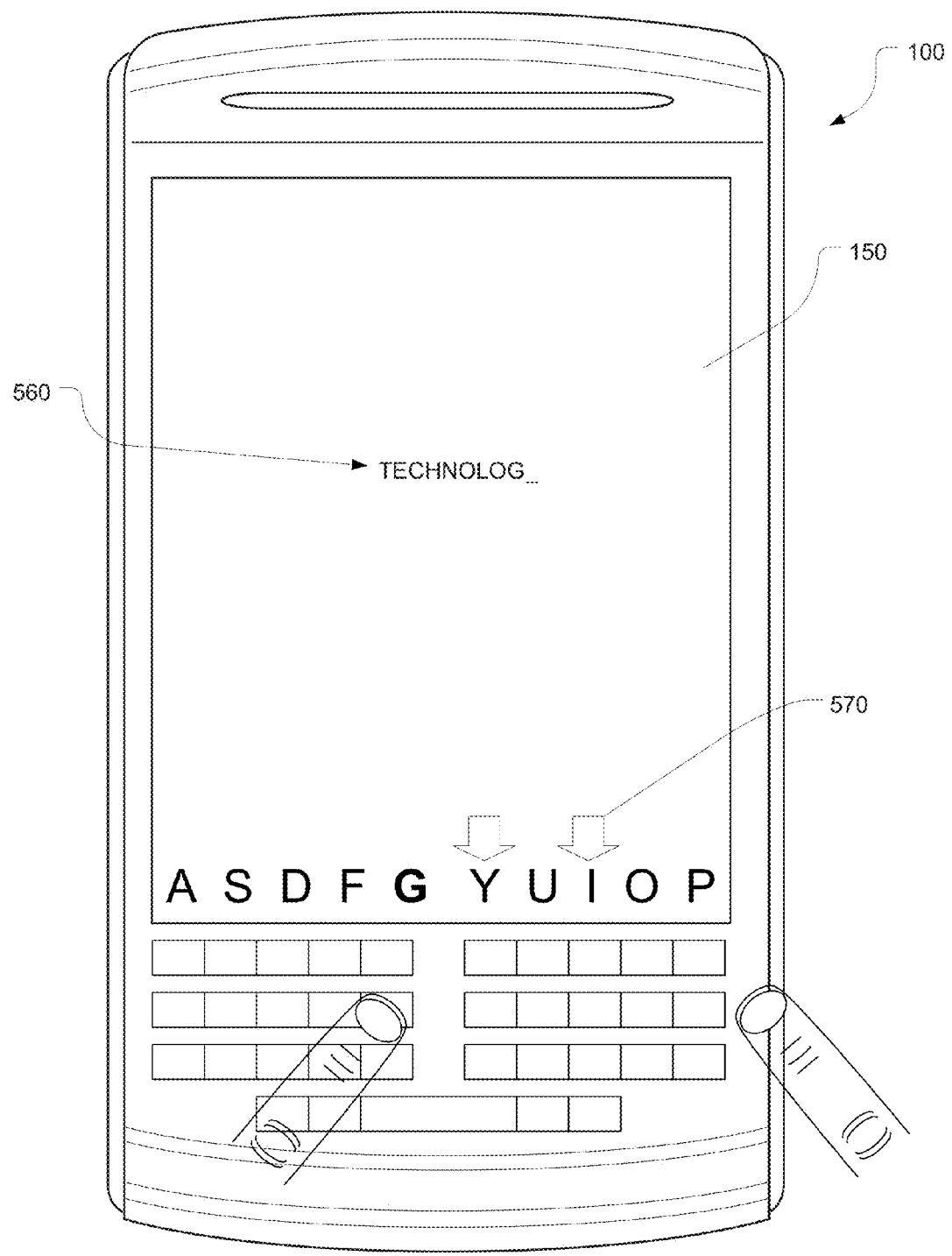
FIG. 16 depicts a mobile device in which the real-time spell checker suggests two possible letters to complete the word onscreen by pointing to two possible letters of the right-side row.

FIG. 16 depicts a mobile device in which a real-time spell checker executed by the processor of the device suggests two possible letters to complete the word onscreen by pointing to two possible letters of the right-side row. The word 560 being completed is predicted by the device to be either "Technology", "Technologies", "Technological", "Technologically" or "Technologist". To complete one of these words, the device determines that the next letter is thus either Y or I. The Y and I characters happen to be both in the top right-side row of keys. This key group is displayed with arrows 570 pointing to the two suggested letters Y and I. Note that this can work in two different ways: in the first case, the device instantiates the set of characters containing the suggested letter even if the user has not selected a group of characters; or, in the second case, the device only identifies a suggested letter for a set of characters that the user has already caused the device to instantiate.

Figure 17:
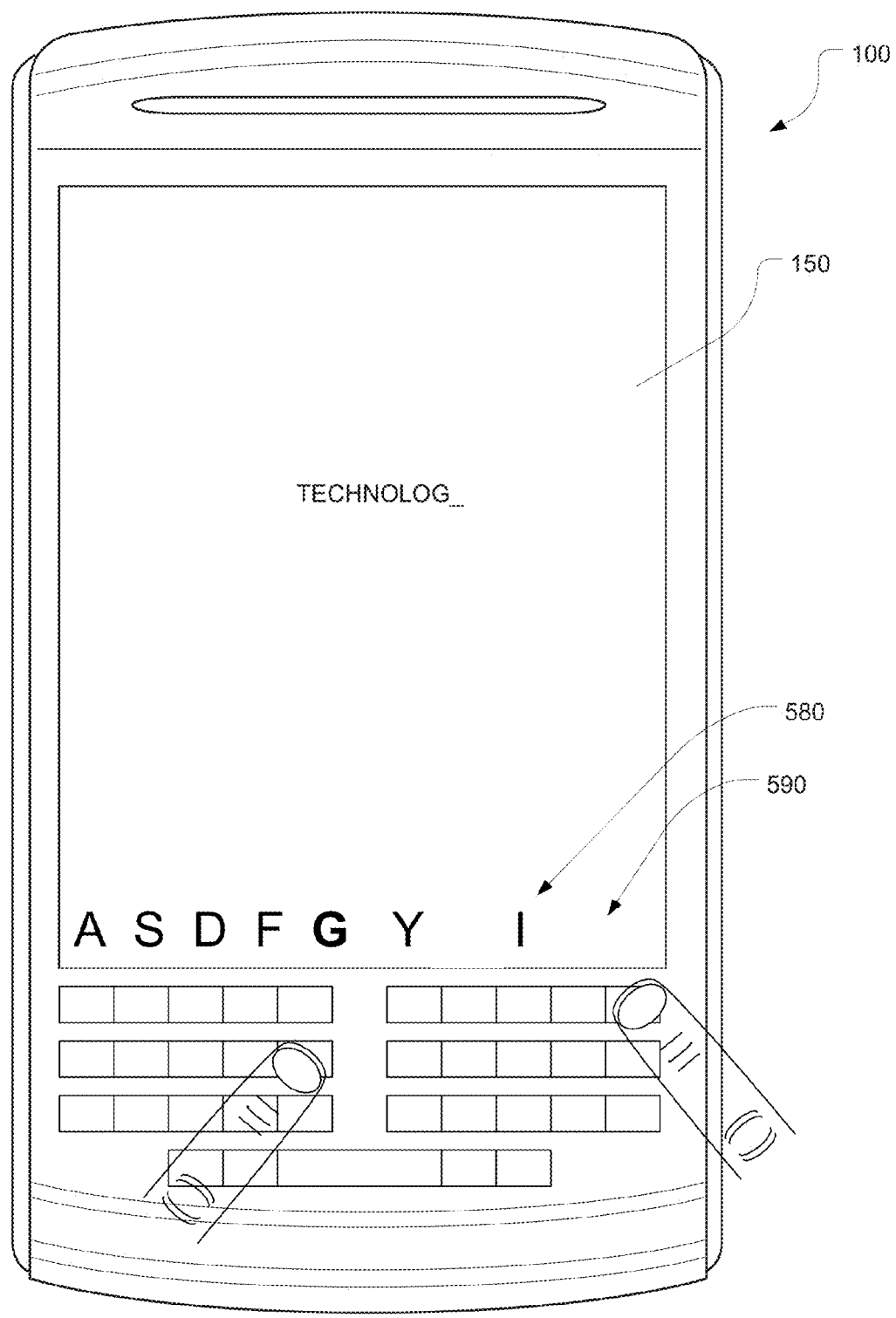
FIG. 17 depicts a mobile device in which the real-time spell checker suggests two possible letters to complete the word onscreen by removing all other letters of the right-side row.

FIG. 17 depicts a mobile device in which the real-time spell checker suggests two possible letters to complete the word onscreen by removing all other letters of the right-side row. In this example, the same word letters Y and I are suggested to complete the word that has been partially typed onscreen. Rather than arrows, this example shows how all other letters U, O and P are eliminated (i.e. not rendered onscreen) as these cannot be possibly used to complete any known word. The suggested letters Y and I (denoted by 580) are thus displayed along with blank spaces 590. In one embodiment, the user can cause the invisible letters U, O, P to be displayed by touching the respective U, O or P keys. Thus, the device may permit the user to effectively override the suggestion algorithm at any time.

Figure 18:
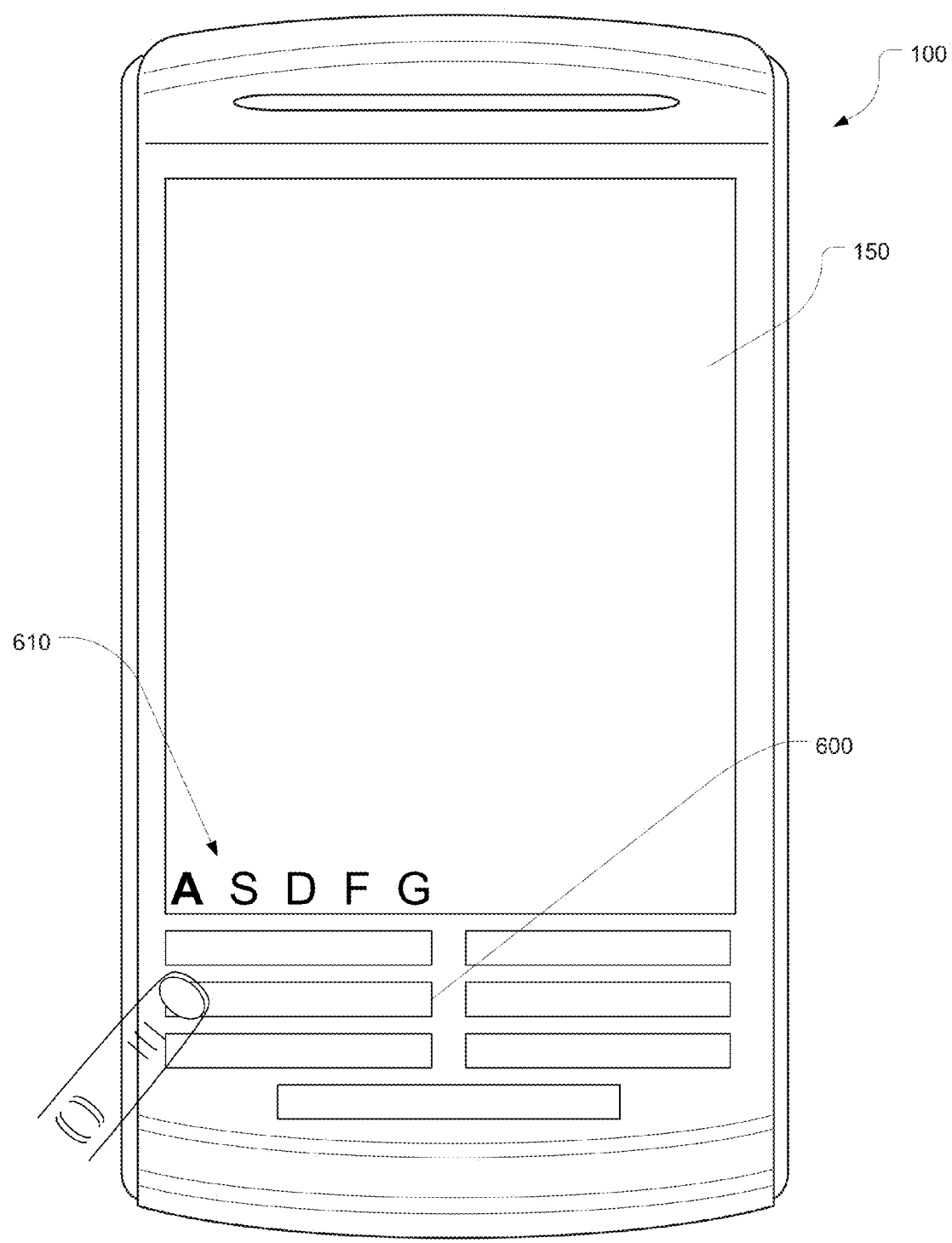
FIG. 18 depicts a mobile device with another type of hybrid keyboard in which the keys are integrated in the form of elongated touch-sensitive bars.
Figure 19:
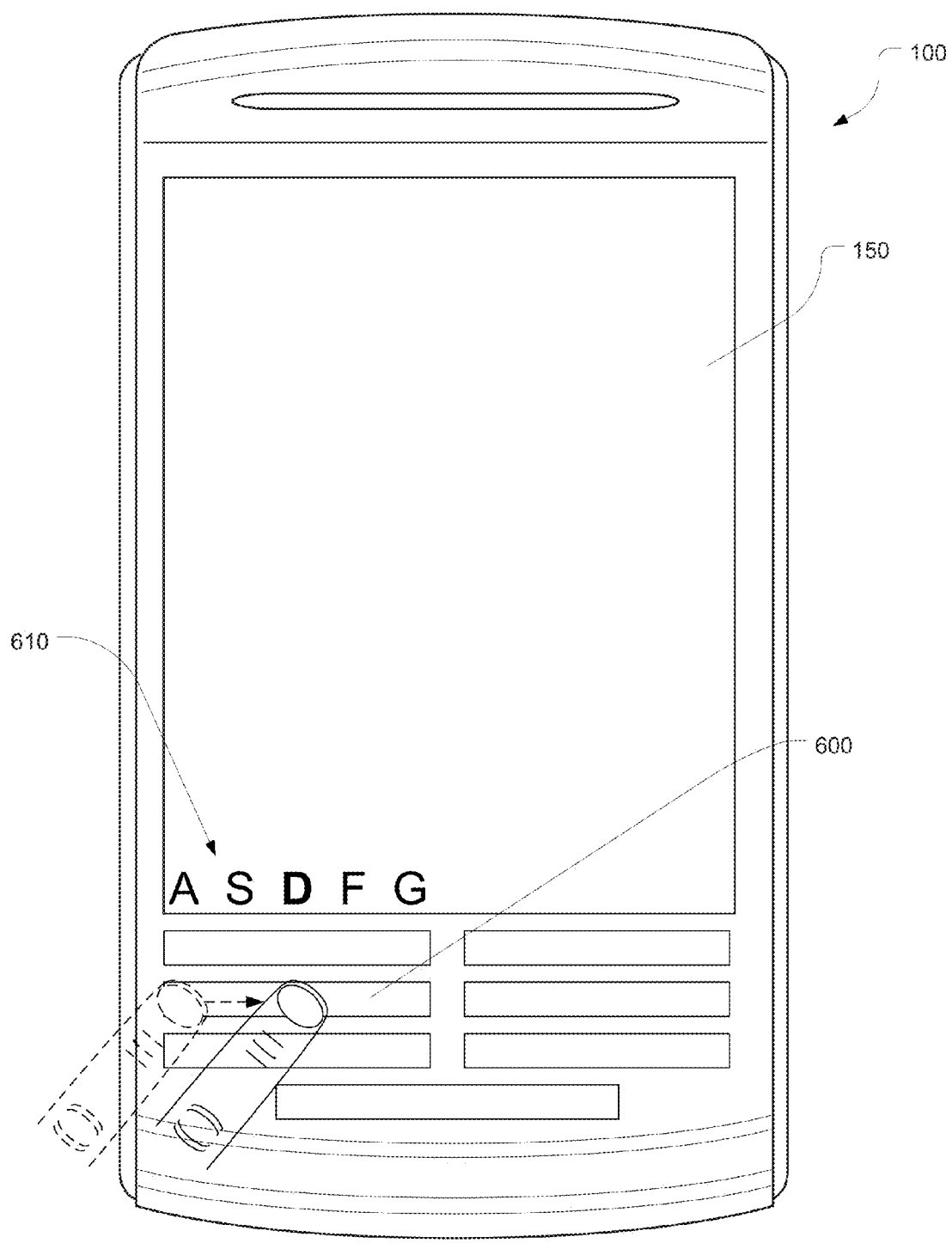
FIG. 19 depicts how the characters are sequentially highlighted as the user slides a finger along the elongated bar of the device of FIG. 18.
Figure 20:
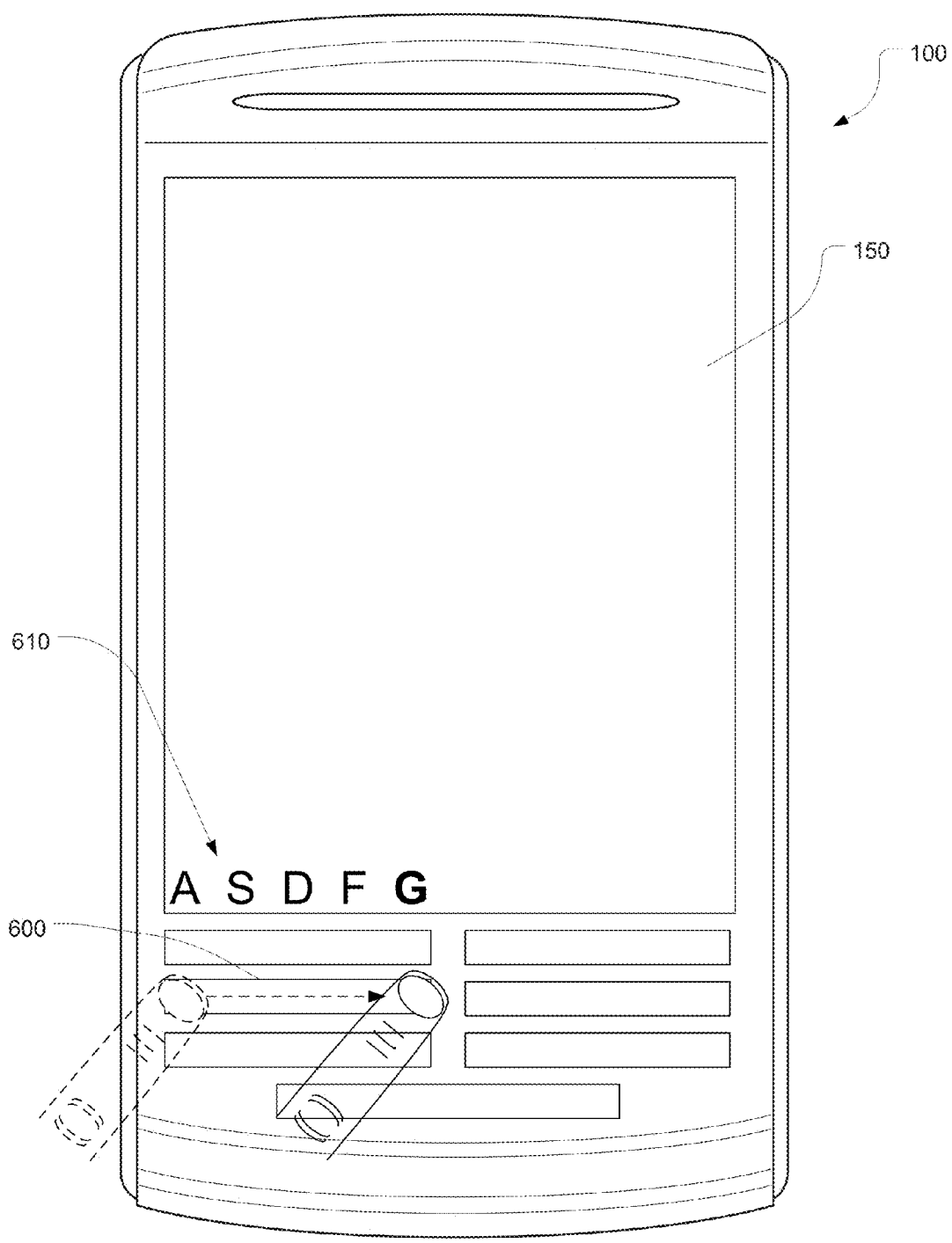
FIG. 20 depicts a further change in the highlighted character as the user continues to slide a finger along the elongated bar of the device of FIG. 18.

In the embodiment depicted by way of example in FIGS. 18-20, each row or group of keys is integrated in the form of a single elongated touch-sensitive bar 600 comprising a series of capacitive touch sensors within the bar that, in specific embodiments, are disposed in a linear and equidistantly spaced fashion within the elongated bar. To operate this form of keyboard, the user touches one of the seven bars to select the group of keys represented by the bar. For example, the upper left bar could represent Q, W, E, R, T, and the middle left bar could represent A, S, D, F, G, and so on. In response to this touch input, the characters 610 corresponding to the touched bar are instantiated (displayed) onscreen. To select one of the displayed characters, the user slides his or her finger along the elongated bar until the desired character is highlighted. This is illustrated by the sequence of FIGS. 18-20. As shown in these figures, as the user's finger or thumb slides along the bar and is detected by the row of capacitive touch sensors, the corresponding character is highlighted or otherwise graphically indicated to provide visual feedback to the user. The user can then click on or depress the bar at the given location along the bar to select the key being displayed onscreen. The bar may be monolithic (completely smooth with no demarcations between virtual keys) or it may have grooves or lighting between virtual keys to guide the user as the user slides his or her finger along the bar. In effect, the bar acts as a group of integrated keys. As will be appreciated, the user may slide his or her finger left to right or right to left or repeatedly back and forth. The displayed characters will in most embodiments disappear after the touch input is removed, which may occur immediately or after a predetermined period of time. The user may also touch any point along the bar to cause the row of characters to be instantiated onscreen. The user may touch two bars simultaneously, e.g. with left and right hands. In that case, the device will instantiate the characters associated with the left and rights bars that are receiving touch input.

The hybrid keyboard described above provides a novel user interface and also a novel method of receiving and displaying user input.

Figure 21:
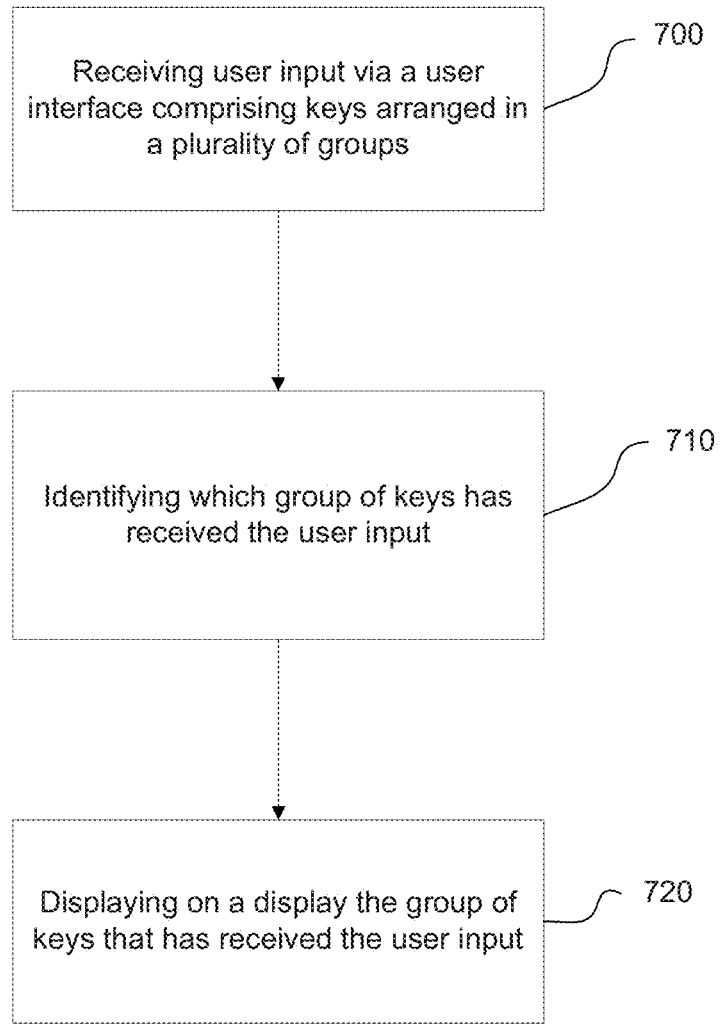
FIG. 21 is a flowchart depicting a method performed by the mobile device in accordance with an implementation of the present technology.

As depicted by way of example in FIG. 21, a method performed by a mobile device entails receiving (step 700) user input via a user interface comprising keys arranged in a plurality of groups, identifying (step 710) which group of keys has received the user input, and displaying (step 720) on a display the group of keys that has received the user input.

In one implementation of this method, displaying the characters entails displaying the characters along a bottom portion of the display. In other words, each of the characters corresponding to the keys of the group of keys that has received the user input is displayed along the bottom portion of the display screen.

In a further implementation, the device graphically highlights a selected character corresponding to the key of the group of keys that has received the user input.

In one specific implementation, the keys are arranged in a plurality of left-side rows and a plurality of right-side rows. The method, in this specific implementation, displays characters corresponding to one of the plurality of left-side rows that has received first user input and simultaneously displays characters corresponding to one of the plurality of right-side rows that has received second user input.

Receiving user input may entail detecting one of a plurality of rows of keys using capacitive touch sensors in the keys. Detection of a thumb or finger may be done by detecting contact with the key, a minimum force (pressure) exerted on the key, or even the proximity of the finger or thumb to the key. Other (non-capacitive-based) technologies may be used to detect the touch input provided by the user. Receiving user input further may also entail providing mechanical haptic feedback in response to touching the key.

In one further implementation, displaying the group of keys comprises predicting a word being spelled and graphically indicating a suggested key to complete the word. This may involve highlighting, bolding or emphasizing letters, increasing or changing the font or color of certain letters. Conversely, letters that are not possibly required to complete a word may be removed, greyed out, minimized or rendered semi-transparent or invisible. Word-completion suggestions may be activated or deactivated in response to user input.

Any of the methods disclosed herein may be implemented in hardware, software, firmware or any combination thereof. Where implemented as software, the method steps, acts or operations may be programmed or coded as computer-readable instructions and recorded electronically, magnetically or optically on a fixed, permanent, non-volatile or non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s).

A computer-readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

This invention has been described in terms of specific embodiments, implementations and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

The invention claimed is:

1. A method performed by a mobile device, the method comprising:
    receiving user input via a user interface comprising keys for each letter of an alphabet, wherein the keys are arranged in a plurality of left-side rows and a plurality of right-side rows, and wherein the user input is received simultaneously on both one of the left-side rows and one of the right-side rows;

identifying which rows of keys have received the user input; and displaying, on a display separate from the user interface, a plurality of characters corresponding to keys of the one of the left-side rows and simultaneously displaying, on the display, a plurality of characters corresponding to keys of the one of the right-side rows.

2. The method as claimed in claim 1 wherein displaying the characters comprises displaying the characters along a bottom portion of the display.

3. The method as claimed in claim 2 wherein displaying comprises graphically highlighting a selected character corresponding to the key of at least one of the left-side row and the right-side row of keys that has received the user input.

4. The method as claimed in claim 1 wherein receiving user input comprises detecting at least one of the left-side row and the right-side row of keys using capacitive touch sensors in the keys.

5. The method as claimed in claim 4 wherein receiving user input further comprises providing mechanical haptic feedback at a particular key in response to touching the key.

6. The method as claimed in claim 1 wherein the displaying comprises predicting a word being spelled and graphically indicating a suggested key to further complete the word.

7. A non-transitory computer-readable medium comprising instructions in code which when loaded into a memory and executed by a processor of a mobile device cause the mobile device to:

receive user input via a user interface comprising keys for each letter of an alphabet, wherein the keys are arranged in a plurality of left-side rows and a plurality of right-side rows, and wherein the user input is received simultaneously on both one of the left-side rows and one of the right-side rows;

identify which rows of keys have received the user input; and display, on a display separate from the user interface, a plurality of characters corresponding to keys of the one of the left-side rows and simultaneously display, on the display, a plurality of characters corresponding to keys of the one of the right-side rows.

8. The computer-readable medium as claimed in claim 7 comprising code for displaying along a bottom portion of the display each of the characters corresponding to the keys of at least one of the left-side row and the right-side row of keys that has received the user input.

9. The computer-readable medium as claimed in claim 8 comprising code to cause the device to graphically highlight a selected character corresponding to the key of at least one of the left-side row and the right-side row of keys that has received the user input.

10. The computer-readable medium as claimed in claim 7 comprising code for detecting at least one of the left-side row and the right-side row of keys using capacitive touch sensors in the keys.

11. The computer-readable medium as claimed in claim 10 comprising code for providing mechanical haptic feedback at a particular key in response to touching the key.

12. A mobile device comprising:

a user interface comprising a plurality of keys for each letter of an alphabet arranged in a plurality of left-side rows and a plurality of right-side rows;

a processor operatively coupled to the user interface to receive user input from the user interface simultaneously on both one of the left-side rows and one of the right-side rows and to identify which rows of keys have received the user input; and a display separate from the user interface and operatively coupled to the processor for displaying a plurality of characters corresponding to keys of the one of the left-side rows and simultaneously displaying a plurality of characters corresponding to keys of the one of the right-side rows.

13. The mobile device as claimed in claim 12 wherein the user interface is a keyboard comprising a plurality of capacitive touch keys.

14. The mobile device as claimed in claim 12 wherein the user interface is a keyboard comprising a plurality of capacitive touch keys having haptic feedback.

15. The mobile device as claimed in claim 12 wherein the user interface comprises:

at least two left-side rows of keys;

at least two right-side rows of keys aligned with but spaced apart from the left-side rows of keys; and a bottom row of keys including a space bar key.

16. The mobile device as claimed in claim 15 wherein the keys are configured as a QWERTY keyboard.

17. The mobile device as claimed in claim 12 wherein the keys comprise capacitive touch sensors with haptic feedback and are arranged in a QWERTY keyboard configuration as seven groups of keys consisting of an upper row split into left and right groups, a middle row split into left and right groups, a lower row split into left and right groups, and a bottom row disposed beneath the lower row.

18. A mobile device comprising:

a user interface comprising a plurality of keys for each letter of an alphabet arranged in a plurality of rows comprising:

at least two left-side rows of keys;

at least two right-side rows of keys aligned with but spaced apart from the left-side rows of keys; and a bottom row of keys including a space bar key;

a processor operatively coupled to the user interface to receive user input from the user interface and to identify which row of keys has received the user input; and a display separate from the user interface and operatively coupled to the processor for displaying simultaneously a plurality of characters corresponding to keys of one of the left-side rows if the user input is received on the one of the left-side rows and for displaying simultaneously a plurality of characters corresponding to keys of one of the right-side rows if the user input is received on the one of the right-side rows.

19. The mobile device as claimed in claim 18 wherein the keys are configured as a QWERTY keyboard.

20. A mobile device comprising:

a user interface comprising a plurality of keys for each letter of an alphabet, wherein the keys comprise capacitive touch sensors with haptic feedback and are arranged in a QWERTY keyboard configuration constituted by groups of keys including at least two rows split into left and right groups;

a processor operatively coupled to the user interface to receive user input from the user interface and to identify which row of keys has received the user input, wherein the user input is received simultaneously on both one of the left groups and one of the right groups; and a display separate from the user interface and operatively coupled to the processor for displaying simultaneously a plurality of characters corresponding to the keys of the rows of keys that have received the user input.

* * * * *